United States Patent [19]

Kando et al.

[11] Patent Number: 5,105,403
[45] Date of Patent: Apr. 14, 1992

[54] OPTICAL INFORMATION READING APPARATUS WITH WAVEGUIDE AND DIFFRACTION GRATING

[75] Inventors: Hidehiko Kando, Matsudo; Shozo Saekusa, Ibaraki, both of Japan

[73] Assignee: Hitachi, Ltd., Tokyo, Japan

[21] Appl. No.: 301,961

[22] Filed: Jan. 25, 1989

[30] Foreign Application Priority Data

Jan. 27, 1988 [JP] Japan ................... 63-14408
Feb. 24, 1988 [JP] Japan ................... 63-39406

[51] Int. Cl.$^5$ .................. G11B 7/00; G11B 7/135
[52] U.S. Cl. .................. 369/44.12; 369/109; 369/112; 385/14; 385/37
[58] Field of Search .......... 369/44.12, 100, 109, 369/112, 13, 112; 350/96, 162

[56] References Cited

U.S. PATENT DOCUMENTS

| | | | |
|---|---|---|---|
| 4,758,062 | 7/1988 | Sunagawa et al. | 350/96.19 |
| 4,779,259 | 10/1988 | Kona et al. | 369/112 |
| 4,826,270 | 5/1989 | Opheij et al. | 350/162.23 |
| 4,894,815 | 1/1990 | Yamanaka | 369/112 |
| 4,937,808 | 6/1990 | Shimada et al. | 369/44.11 |
| 4,945,525 | 7/1990 | Yamamoto et al. | 369/44.12 |

FOREIGN PATENT DOCUMENTS

| | | | |
|---|---|---|---|
| 0036753 | 3/1987 | Japan | 369/44,12 |
| 0149850 | 6/1988 | Japan | 369/44.12 |

Primary Examiner—Roy N. Envall, Jr.
Assistant Examiner—Thang V. Tran
Attorney, Agent, or Firm—Antonelli, Terry, Stout & Kraus

[57] ABSTRACT

An art for reading information from an optical recording disk by means of a light beam emitted from a semiconductor laser, particularly an optical integrated circuit type apparatus which is improved to suppress fluctuation of the focal point of the beam caused by a change in the wavelength of the laser beam. The apparatus has a substrate, the semiconductor laser beam provided on one end of the substrate and an optical waveguide provided on one side of the substrate and capable of guiding the laser beam from the semiconductor laser. The apparatus further has a first diffraction grating provided on the waveguide and capable of diffracting the guided beam to the exterior of the waveguide and a second diffraction grating disposed at a position where it is capable of receiving the light beam diffracted by the first diffraction grating. According to this arrangement, when the wavelength of the laser beam is changed, the diffraction angle of the laser beam from the first diffraction grating is changed but this change does not cause substantial change in the diffraction angle of the second diffraction grating because the second diffraction grating diffracts the beam in such a direction as to cancel the above-mentioned change in the angle of diffraction of the laser beam from the first diffraction grating. In consequence, fluctuation of the diffraction angle of the laser beam irradiated by the second diffraction grating onto the recording surface of the optical recording disk is suppressed remarkably.

19 Claims, 21 Drawing Sheets

OPTICAL INFORMATION READING APPARATUS WITH WAVEGUIDE AND DIFFRACTION GRATING

BACKGROUND OF THE INVENTION

The present invention relates to an apparatus which handles optical information readably recorded in, for example, an optical disk, optical card, magneto-optical disk and so forth (collectively referred to as "optical information medium"). More particularly, the present invention is concerned with an optical information reading or retrieval apparatus for reading optical information recorded in such an optical information medium.

An optical information reading apparatus is disclosed in an article entitled "An Integrated-Optic Disc Pickup Device" on the Journal of the Institute of Electronics, Information and Engineering, vol. J69-C, No. 5, pp 609-615 (May 1986). The light beam from a source is made to be directed to a slab waveguide, and is then made to be emitted out of the waveguide plane by the acion of a diffraction grating coupler, so as to be focused on the optical information medium.

This known apparatus, however, suffers from a problem in that a large aberration tends to be caused by fluctuation in the wavelength of the beam from te source. The aberration attributable to fluctuation in the wavelength results in a fluctuation in the focal position of the beam which is irradiated on the surface of the information medium for the purpose of reading information recorded in the medium. The fluctuation in the focal position impedes stable reading of the information, thus causing a serious problem. The fluctuation in the focal position can be roughly divided into two types: namely, (a) fluctuation of focal position in the direction of the optical axis (change in the focal distance) and (b) fluctuation of focal position in a direction perpendicular to the optical axis.

The fluctuation in the direction of optical axis causes defocusing, while the fluctuation in the direction perpendicular to the optical axis causes track jump or bit omission.

SUMMARY OF THE INVENTION

An object of the present invention is to provided an optical information reading apparatus in which fluctuation of focal position in the direction perpendicular to the optical axis can be avoided and in which fluctuation position in the direction of the optical axis can be effectively suppressed.

Another object of the present invention is to provide a compact optical information reading apparatus.

Still another object of the present invention is to provide an information reading apparatus which has a reduced number of parts and which is easy to produce.

A further object of the present invention is to provide a reliable optical information reading apparatus which is capable of stably reading optical information.

To these ends, according to one aspect of the present invention, there is provided an optical information reading apparatus comprising: an optical waveguide means for guiding a light beam from a light source; a first diffraction grating for delivering the light beam guided by the waveguide means to an exterior of the waveguide means; a second diffraction grating for diffracting a light beam diffracted by the first diffraction grating; light beam focusing means for converging a light beam from the second diffraction grating and irradiating the converged light beam onto a surface of an optical information medium; and a photodetector for receiving a part or light beam, of the irradiated light beam, reflected by the surface of the optical information medium.

In a preferred form of the present invention, the first diffraction grating and the second diffraction grating are arranged such that a change in a diffraction angle of the first diffraction grating caused by a change in the wavelength of the beam from the source appears in a direction opposite to a direction of a change in a diffraction angle of the second diffraction grating caused by the same change in the wavelength of the beam.

According to another aspect of the present invention, there is provided an optical information reading apparatus comprising: a light source capable of emitting a laser beam; a wavegiude means for guiding the laser beam; a first diffraction grating for causing the laser beam, passing through the waveguide means to emerge from the waveguide means; a second diffraction grating for diffracting the emergent laser beam towards an optical information medium; light beam focusing means for focusing or converging the laser beam from the second diffraction grating and irradiating the converged light beam onto a surface of the optical information medium; deflecting means for deflecting a part or beam, of the irradiated beam, which has been reflected by the surface of the optical information medium and transmitted to the waveguide means through the second and first diffraction gratings; and a photodetector for receiving the beam deflected by the deflecting means.

In another preferred form of the present invention, the beam source, the waveguide path and the photodetector are carried by a substrate, such that the waveguide means is provided on one side of the substrate and the beam source and the photodetector are disposed on one end of the substrate.

The above and other objects, features and advantages of the present invention will become clear from the following description of the preferred embodiments when the same is read in conjuction with the accompanying drawings.

DESCRIPTION OF THE PREFERRED EMBODIMENTS

Preferred embodiments of the present invention will be described hereinunder with reference to the accompanying drawings. A description will be given first of the principle of the invention in which influence of a fluctuation in the wavelength of beam used for reading of optical information is eliminated by means of a pair of diffraction gratings.

Figure 1:
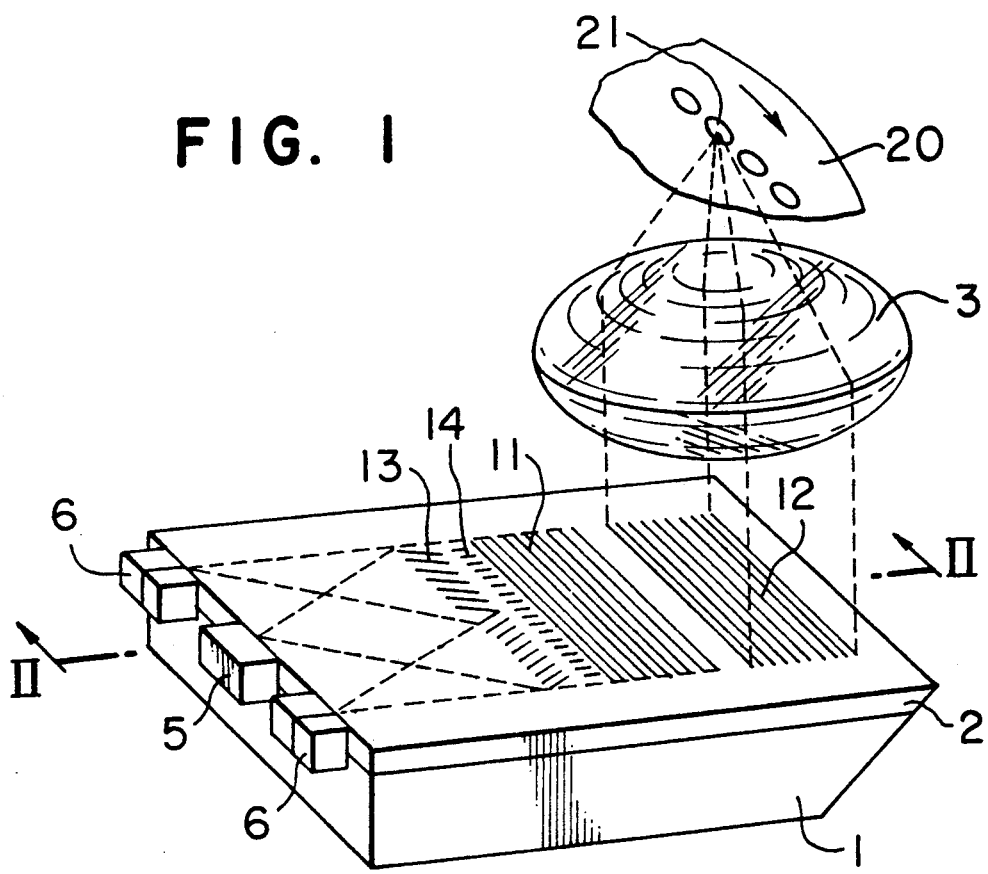
FIG. 1 is a perspective view of an embodiment of the present invention.
Figure 2:
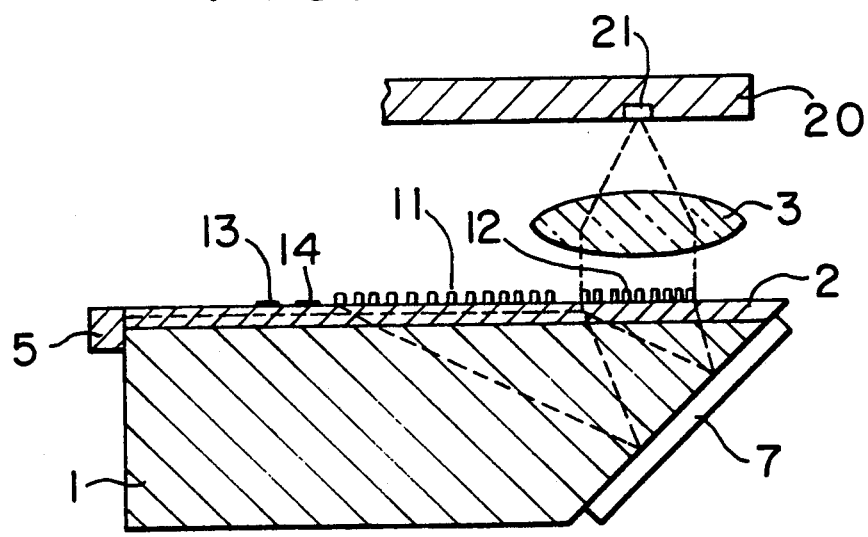
FIG. 2 is a sectional view taken along the line II—II of FIG. 1.
Figure 3:
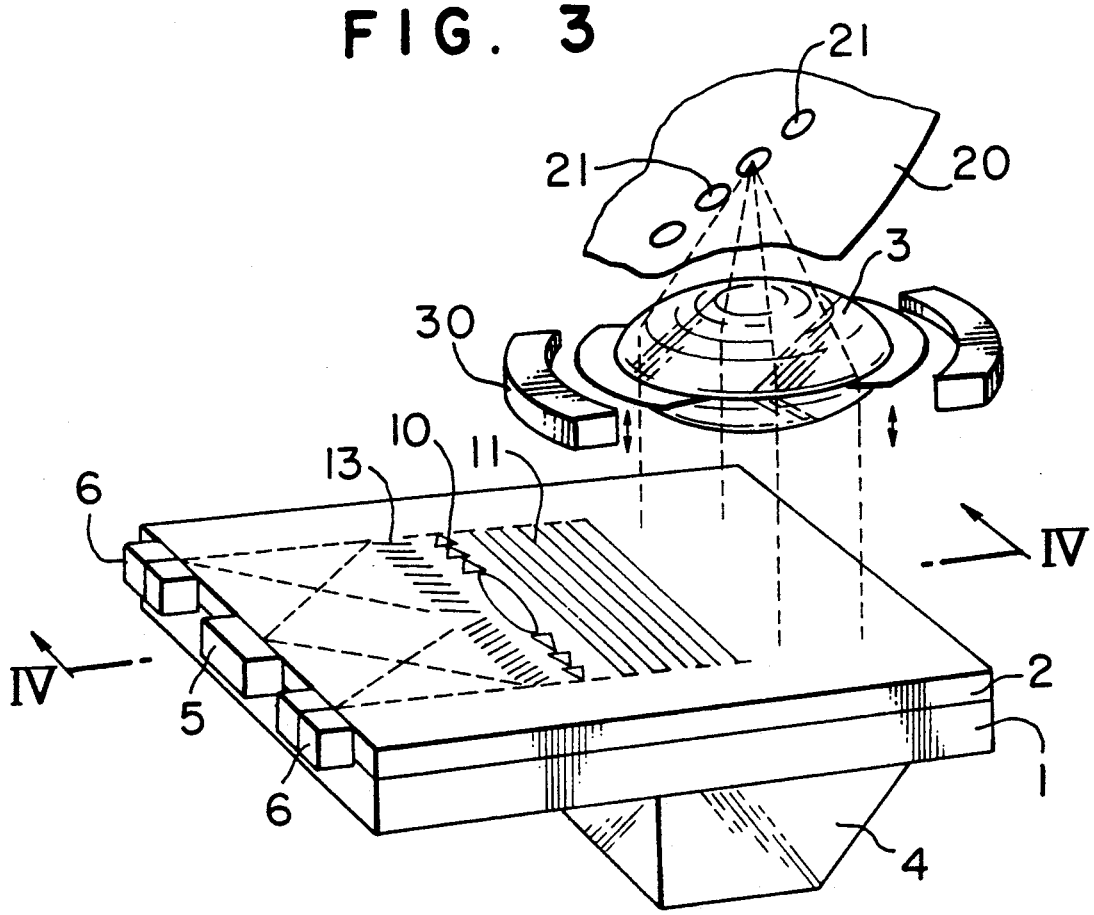
FIG. 3 is a perspective view of another embodiment of the present invention.
Figure 41:
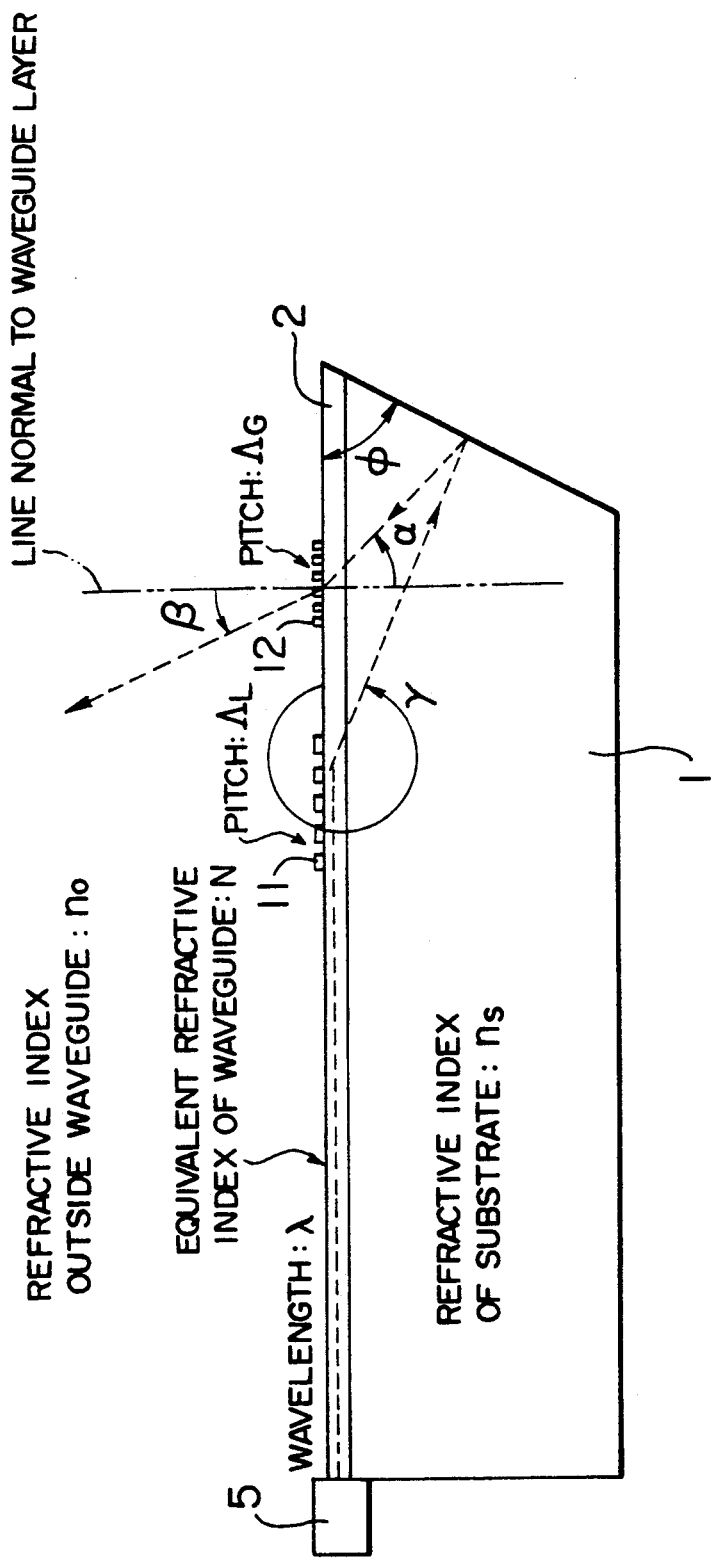
FIG. 41 is an illustration for explaining the manner in which an influence of a fluctuation in wavelength is eliminated.

The description of the principle will proceed with reference to FIG. 41 which shows an arrangement similar to a first embodiment shown in FIGS. 1 and 2. It is to be noted, however, the principle explained in connection with FIG. 41 applies also to other embodiments which are shown in FIGS. 3 onwards.

Referring to FIG. 41, a beam (wavelength $\lambda$) from a semiconductor laser 5 is directed into a waveguide layer 2 provided on a substrate having a refractive index $n_s$. The waveguide layer 2 has an equivalent refractive index of N at the wavelength $\lambda$. The beam then propagates through the waveguide layer 2 and emerges therefrom by the effect of a first diffraction grating 11 having a pitch of $\Lambda_L$, at an emergent angle $\gamma$. The emanating beam is then reflected by a slant plane which intersects the waveguide plane at an angle $\phi$. The beam then impinges upon a second diffraction grating at an incident angle $\alpha$. Finally, the beam emanates in a direction which makes an angle $\beta$ with a line normal to the waveguide layer. It is assumed here that the substance outside the substrate, usually air, has a refractive index of $n_0$.

Figure 4:
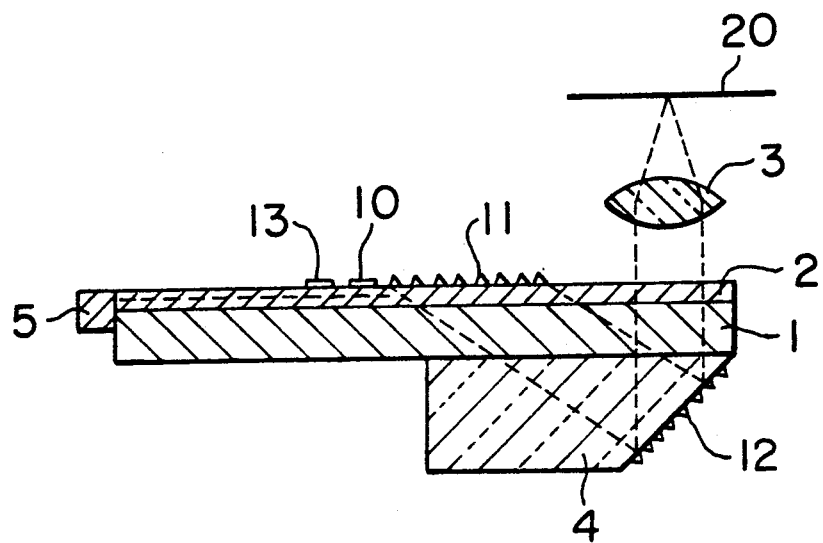
FIG. 4 is a sectional view taken along the line IV—IV of FIG. 3.

The emergent angle $\gamma$ from the first grating 11 can be expressed as follows, in accordance with the teaching of NISHIHARA et al., "OPTICAL INTEGRATED CIRCUIT", (published by Ohmu-sha, in 1985), particularly FIG. 4.13 at page 89.

$$n_s \frac{2\pi}{\lambda} \cos\gamma + \frac{2\pi}{\Lambda_L} = N \frac{2\pi}{\lambda} \quad (1)$$

As will be seen from equation (1), the emergent angle $\gamma$ is dependent on the wavelength $\lambda$. Through differentiation and rearrangement of equation (1), the change in the emergent angle with respect to a change in the wave length can be expressed as follows.

$$d\gamma \frac{1}{\sin\gamma} \left( \frac{N}{n_s} - \cos\gamma \right) \frac{d\lambda}{\lambda} \quad (2)$$

The wavelength dependencies of the equivalent refractive index N and the refractive index $n_s$ of the substrate are small so that they are neglected. It is to be understood that, strict rearrangned of the formula incorporating these dependencies only serves to increase the number of terms employed in the equation and does not change the following discussion.

The beam coming out of the first diffraction grating 11 at the emergent angle $\gamma$ is reflected by the refelection plane of the angle $\phi$ and is then made incident on the second diffraction grating 12 at the incident angle $\alpha$. From the geometrical arrangement shown in FIG. 41, the angles mentioned above are expressed by the following equation:

$$\gamma + \alpha - 2\phi - \frac{3}{2}\pi = 0 \quad (3)$$

From equation (3) above, it is understood that the following change $d\alpha$ is caused in response to the change in the angle γ caused by the change dλ in the wavelength.

$$d\alpha = -d\gamma \quad (4)$$

The beam incident on the second diffraction grating at angle α emerges from the same at the angle β which is represented as follows from the condition of diffraction and refraction.

$$n_0 \Lambda_G \sin\beta = n_s \Lambda_G \sin\alpha + m\lambda \quad (5)$$

where, $m = \pm 1, \pm 2, \pm 3, \ldots$ (diffraction order numbers).

By differentiating euation (5) with respect to the wavelength λ, the change dβ of the emergent angle β in response to change in the incident angle α caused by the change dλ in the wavelength is expressed as follows.

$$n_0 \Lambda_G \cos\beta d\beta = n_s \Lambda_G \cos\alpha d\alpha + m d\lambda \quad (6)$$

From the equations (1) to (6), the wavelength dependency dβ/dλ of the final emergent angle λ on the wavelength λ is given as follows.

$$\frac{d\beta}{d\lambda} = \frac{-1}{n_0 \Lambda_G \cos\beta}\left(\frac{C}{A} - m\right) \quad (7)$$

$$C = n_0 \Lambda_G \cos\alpha \frac{1}{\sin\gamma}\left(\frac{N}{n_s} - \cos\gamma\right) \quad (8)$$

where, C is a constant which is determined by the
waveguide parameters (thickness of waveguide, refractive index of waveguide, refractive index of substrate), first and second diffraction gratings (grating pitches, number of orders of diffraction used)
configuration of substrate (angle formed between reflection surface and waveguide layer), and light source (standard wavelength).

It is assumed that these design parameters are determined to meet the following conditions:

$$C = m\lambda_0 \quad (9)$$

where, $\lambda_0$ is a representative value of the wavelength of oscillation of the beam source and is a design wavelength in the design of the optical element.

The following condition is derived from equation (7):

$$\left(\frac{d\beta}{d\lambda}\right) = 0 \quad (10)$$
$$\lambda = \lambda_0$$

it will be seen that fluctuation of the wavelength from the design wavelength $\lambda_0$ does not cause any change in the final emergent angle β. i.e., the angle at which the beam emerges from the second diffraction grating.

It is thus possible to eliminate any influence on the final emergent angle β caused by a fluctuation in the wavelength, by the combination of the first and second diffraction gratings.

In a more strict sense, equation (10) is valid only when the condition of $\lambda = \lambda_0$ is met. Practically, however, the following condition is attained when the wavelength falls within a given range, i.e., when the condition of $|\lambda - \lambda_0| \leq \Delta\lambda$ is met.

$$\left(\frac{d\beta}{d\lambda}\right)_{|\lambda-\lambda_0|\leq\Delta\lambda} \approx 0 \quad (11)$$

The fluctuation or change dβ in the final emergent angle causes a change in the position of focal point of the beam formed on the optical information medium (20) by the lens (3), resulting in various troubles such as mis-tracking or zitter during reading or writing or information.

According to the invention, however, the positional change in the focal point is very small when the wavelength fluctuates about the design wavelength $\lambda_0$ and the influence of such fluctuation is materially negligible when the amount of change $|\lambda - \lambda_0|$ does not exceed a predetermined value Δλ.

It will be understood that, according to the present invention, the amount of change dβ in the final emergent angle caused by a change in the wavelength of the light beam from the source can be reduced to a negligibly small level in the wavelength region around the design wavelengt $\lambda_0$.

The principle of the present invention has been described with reference to an arrangement which is similar to that of the first embodiment shown in FIGS. 1 and 2. It is to be noted, however, the described principle can be applied to all the embodiments which will be described later. Namely, according to the present invention, the amount of change in the emergent angle of beam from the second diffraction grating is determined from the emergent angle from the first diffraction grating, amount of change of this emergent angle in relation to change in the wavelength, and the angle of incidence to the second diffraction grating, and the values of various design parameters are determined such that the amount of change in the emergent angle from the second diffraction grating thus determined becomes zero on codition of $\lambda = \lambda_0$. This principle is applicable to various cases. For instance, the second diffraction grating may be a reflection type diffraction grating. The arrangement also may be such that a prism or the like is disposed on the outlet side of the second diffraction grating. Discussion of in each of such cases, however, is omitted because they are esentially the same so long as the principle above is concerned.

A stable optical performance having no dependency on the wavelength can be obtained also in a reverse process, i.e., when the light reflected from the optical information medium is diffracted by the second diffraction grating and is made to propagate through the waveguide after the action of the first diffraction grating.

The first embodiment of the present invention will now be described with reference to FIG. 1 which is a perspective view of the first embodiment and FIG. 2 which is a sectional view taken along the line II—II of FIG. 1. A light beam emitted from a semiconductor laser 5 impinges upon an optical waveguide layer 2 which is disposed adjacent to the substrate 1 so as to become a guided light wave which propagates through the waveguide layer 2. The guided light wave is materially collimated by a waveguide lens 15 and is then made to emerge from the waveguide by the action of the first diffraction grating 11. The light emerging from the waveguide 2 is reflected by a reflection layer 7 which serves as reflecting means and is diffracted by a second diffraction grating 12. The diffracted light beam is then converged by the action of a lens 3 so as to be focused on the optical information medium 20, thereby reading optical information 21 thereon. The light reflected by the optical information medium 20 then traces the same optical path in the reverse direction so as to become the guided light wave. The beam thus guided through the waveguide 2 is then split by a beam splitter 13 and is made to impinge upon a light intensity detector 6. The output from the light intensity detector 6 is electrically processed by an electrical processing circuit not shown, whereby electrical signals corresponding to the optical information are formed.

In the arrangement shown in FIGS. 1 and 2, the first diffraction grating 11 and the second diffraction grating 12 have wavelength dispersion characteristics at their respective diffraction angles. These diffraction gratings 11 and 12 are arranged such that the wavelength dispersion characteristics of both diffraction gratings negate each other. Namely, the second diffraction grating 12 is so disposed that it receives and diffracts again the light which has been diffracted by the first diffraction grating 11. In this case, fluctuation in the wavelength of the semiconductor laser 5 does not cause increase in the total wavelength dispersion because the wavelength dispersions caused by the first and the second diffraction gratings 11, 12 negate each other. In consequence, generation of aberration due to wavelength dispersion can be suppressed even in the case where the semiconductor laser is not wavelength-stabilized. Use of an additional lens will eliminate the necessity for provision of light condensing means in the diffraction grating or reduce the extent of light condensation to be provided in the diffraction grating, so that the wavelength dispersion characteristic attributable to the light condensation function is decreased so as to further reduce aberration attributable to the wavelength fluctuation.

The described embodiment can be designed such that the light from the diffraction grating 12 is directed towards the optical information medium in a direction perpendicular to the substrate 1, so that the overall height of the apparatus can be decreased advantageously. Both the first diffraction grating such as grating coupler and the second diffraction grating may be of linear type which is easier to fabricate than curvilinear type. It is also to be noted that the described embodiment can be produced by a simple production process because the first diffraction grating 11 and the second diffraction grating 12 can be formed on a common plane.

A different embodiment will be described with reference to FIGS. 3 and 4. Referring to these Figures, a beam emitted from a semiconductor laser 5 is made incident to a waveguide 2 which is disposed in contact with or in close proximity of a substrate 1, so as to become a guided light wave. The beam is substantially collimated by the action of a waveguide type lens 10. The collimated beam is then made to come out of the surface of the waveguide 2 faced to the substrate 1 by the action of a first diffraction grating 11. The emerging beam is then diffracted and deflected by the action of a second diffraction grating (reflection type diffraction grating is used in this case) 12 which is provided on the surface of a modified prism 4 disposed in contact with or in the close proximity of the substrate 1. The beam is then made to impinge upon a lens 3 so as to be focused on an optical information recording medium 20 thereby enabling read information from pits 21 in the surface of the medium 20. The light reflected from the medium 20 runs along the same optical path in the reverse direction and is deflected by a beam splitter 13 so as to be converted into electrical signals by means of a plurality of photodetectors 6. The thus obtained electrical signals are processed by a suitable electrical signal processing circuit so that electrical signals corresponding to the optical information are delivered from the electrical signal processing circuit.

Referring to FIG. 3, the lens 3 is adapted to be actuated by a lens actuator 30 so as to focus the beam on the optical information medium 20. In the illustrated embodiment, the lens actuator 30 is a magnetic actuator which includes a magnetic member attached to the lens 3 and an external coil which, when energized, produces electromagnetic force to selectively attract the magnetic member thereby moving the lens 3 up and down. This type of lens actuator is well known so that detailed description thereof is omitted. The positional control of the focal point is conducted by detecting deviation of the level of the light received by the photodetector 6 (or level of electrical signal from the photodetector) from a known level corresponding to the in-focus state of the optical system, and operating the lens actuator 30 so as to reduce the deviation to zero.

This embodiment facilitates the production of the apparatus because the grating patterns of equal pitch can be used both for the first diffraction grating 11 and the second diffracton grating 12.

In additon, the following advantage is brought about by the fact that the focusing of the beam on the optical information medium 20 is conducted by a lens 3. Namely, the lens 3 may be composed of a combination of a plurality of lenses which is less liable to cause chromatic aberration or lenses such as an aspherical lens. Therefore, elimination of aberration can be conducted in a rational manner such that movement of the focal point due to color aberration is eliminated by the actions of the first and second diffraction gratings 11 and 12, while fluctuation in the focal distance or enlargement of the spot diameter are eliminated by the lens 3 individually.

In this embodiment, focusing and/or fine tracking is conducted by moving the lens 3. Since only the light lens 3 is to be moved, a high-speed focusing and fine-tracking operations can be performed.

Figure 5:
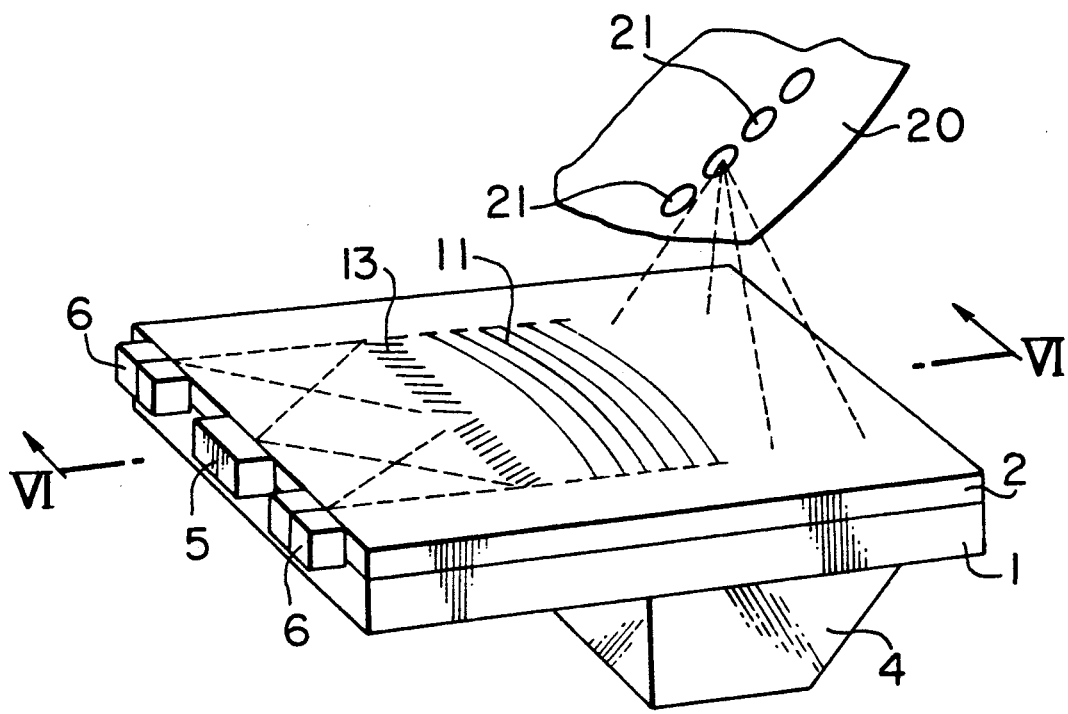
FIG. 5 is a perspective view of still another embodiment of the present invention.
Figure 6:
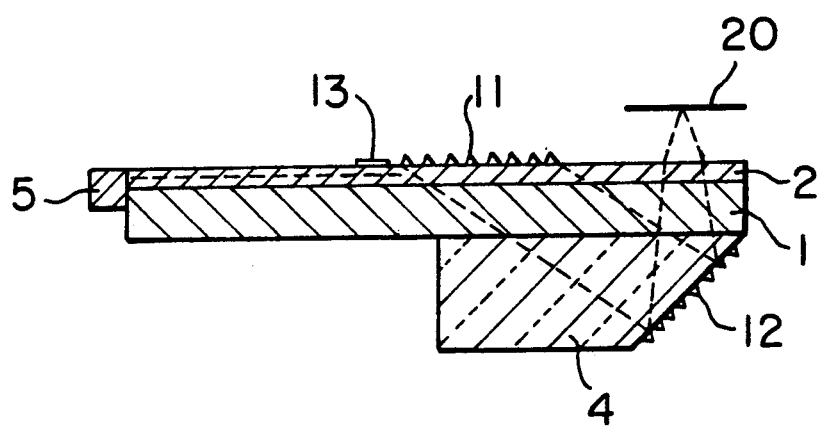
FIG. 6 is a sectional view taken along the line VI—VI of FIG. 5.

A different embodiment of the invention will be described with reference to FIG. 5 which is a perspective view and FIG. 6 which is a sectional view taken along the line VI—VI of FIG. 5. Referring to these Figures, a light beam emitted from a semiconductor laser 5 is made incident to a waveguide 2 which is disposed in contact with or in the close proximity of a substrate 1, so as to become a guided light wave. The guided light wave is made to emerge from the surface of the waveguide 2 faced to the substrate 1, by the effect of a first diffraction grating 11. The emergent beam is then diffracted and deflected by the action of a second diffraction grating 12 provided on a surface of a modified prism 4 which is disposed in contact with or in the close proximity of the substratee 1, so as to be focused at a point on the optical information medium 20, thereby enabling to read information from pits 21 formed in the surface of the medium 20. The light refelected by the optical information medium 20 is made to trace the same optical path in the reverse direction and is deflected by the action of a beam splitter 13 to impinge upon a plurality of photodetectors 6 for photoelectric conversion. The thus converted signals are processed by a suitable electrical signal processing circuit, whereby electrical signals corresponding to the optical information are produced.

This embodiment facilitates the production and simplifies the operation because the waveguide type lens 10 and the lens 3 which are used in the embodiment of FIG. 3 can be dispensed with.

Figure 7:
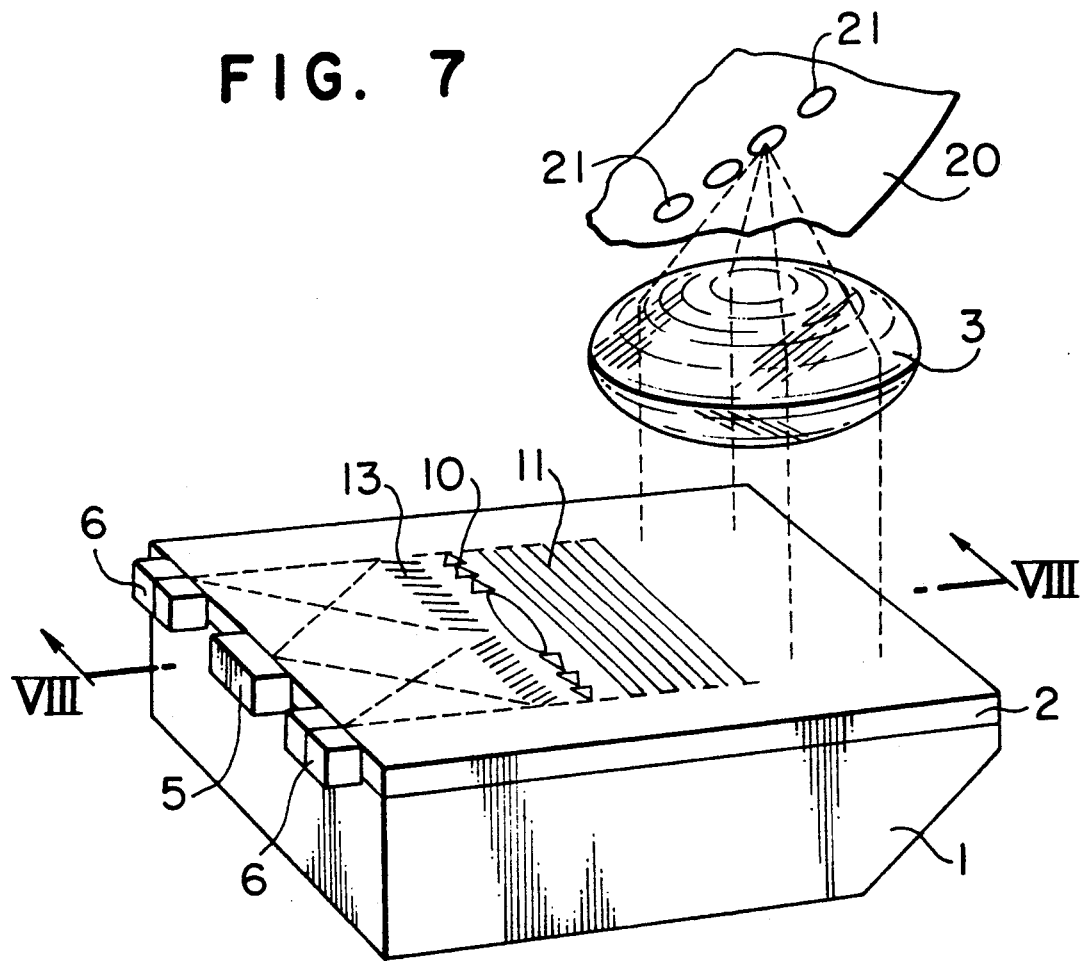
FIG. 7 is a perspective view of a different embodiment of the present invention.
Figure 8:
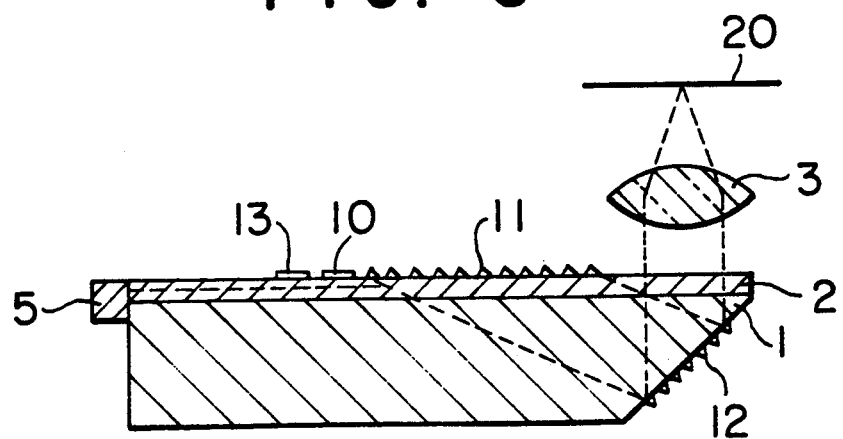
FIG. 8 is a sectional view taken along the line VIII—VIII of FIG. 7.

A different embodiment of the invention will be described with reference to FIG. 7 which is a perspective view and FIG. 8 which is a sectional view taken along the line VIII—VIII of FIG. 7. Referring to these Figures, a beam emitted from a semiconductor laser 5 is made incident to a waveguide 2 which is disposed in contact with or in the close proximity of a substrate 1, so as to become a guided light wave. The beam is substantially collimated by the effect of a waveguide type lens 10. The guided light wave is made to emerge from the surface of the waveguide path faced to the substrate 1, by the effect of the first diffraction grating 11. The emergent beam is then diffracted and deflected by the effect of a second diffraction grating 12 which is formed on an oblique or slant surface integral with the substrate 1, and is made to impinge upon lens 3 so as to be focused at a point on the optical information medium 20, thereby enabling to read information from pits 21 formed in the surface of the medium 20. The light reflected by the optical information medium 20 is made to trace the same optical path in the reverse direction and is deflected by the action of a beam splitter 13 to impinge upon a plurality of photodetectors 6 for photoelectric conversion. The thus converted signals are processed by a suitable electrical signal processing circuit, whereby electrical signals corresponding to the optical information are produced.

This embodiment offers, in addition to the advantages brought about by the embodiment shown in FIG. 3, advantages in that the number of parts is reduced to improve the reliability, because the modified prism 4 shown in FIG. 3 can be formed integrally with the substrate.

Figure 9:
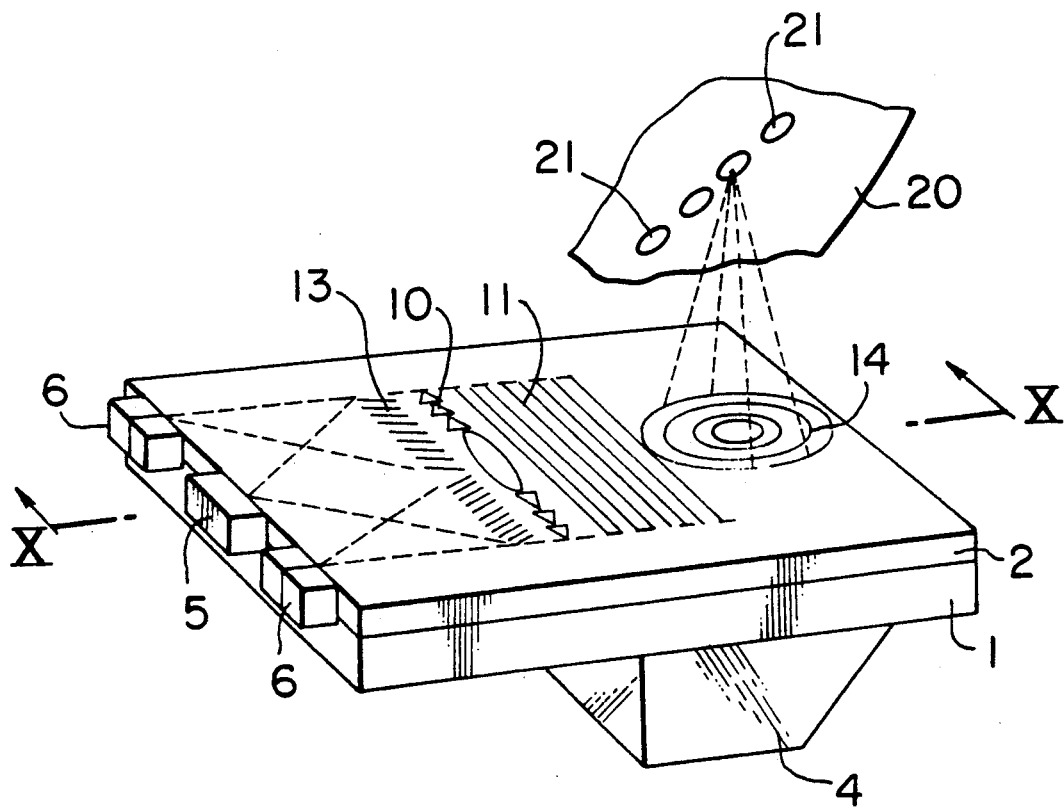
FIG. 9 is a perspective view of a different embodiment of the present invention.
Figure 10:
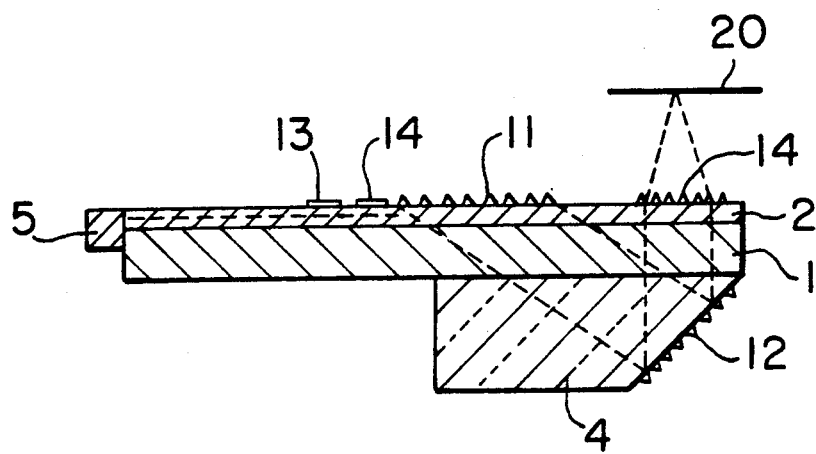
FIG. 10 is a sectional view taken along the line X—X of FIG. 9.

A different embodiment of the invention will be described with reference to FIG. 9 which is a perspective view and FIG. 10 which is a sectional view taken along the line X—X of FIG. 9. Referring to these Figures, light beam emitted from a semiconductor laser 5 is made incident to a waveguide 2 which is disposed in contact with or in the close proximity of a substrate 1, so as to become a guided light wave. The beam is substantially collimated by the effect of a waveguide type lens 10. The guided light wave is made to emerge from the surface of the waveguide 2 faced to the substrate, by the effect of the first diffraction grating 11. The emergent beam is then diffracted and deflected by the effect of a second diffraction grating 12 which is of reflection type and provided on the surface of a modified prism 4 disposed in contact with or in the close proximity of the waveguide surface, and is made to impinge upon a diffraction type lens 14 formed on or in the close proximity of the substrate 1 so as to be focused on the optical information medium 20, thereby enabling to read information from pits 21 formed in the surface of the medium 20. The light reflected by the optical information medium 20 is made to trace the same optical path in the reverse direction and is deflected by the action of a beam splitter 13 to impinge upon a plurality of photodetectors 6 for photoelectric conversion. The thus converted signals are processed by a suitable electrical signal processing circuit, whereby electrical signals corresponding to the optical information are produced.

This embodiment is advantageous because the external lenses in the embodiment of FIG. 3 is made integral in this embodiment, thus contributing to the reduction in the number of parts and, hence, to improvement in the reliability.

Figure 11:
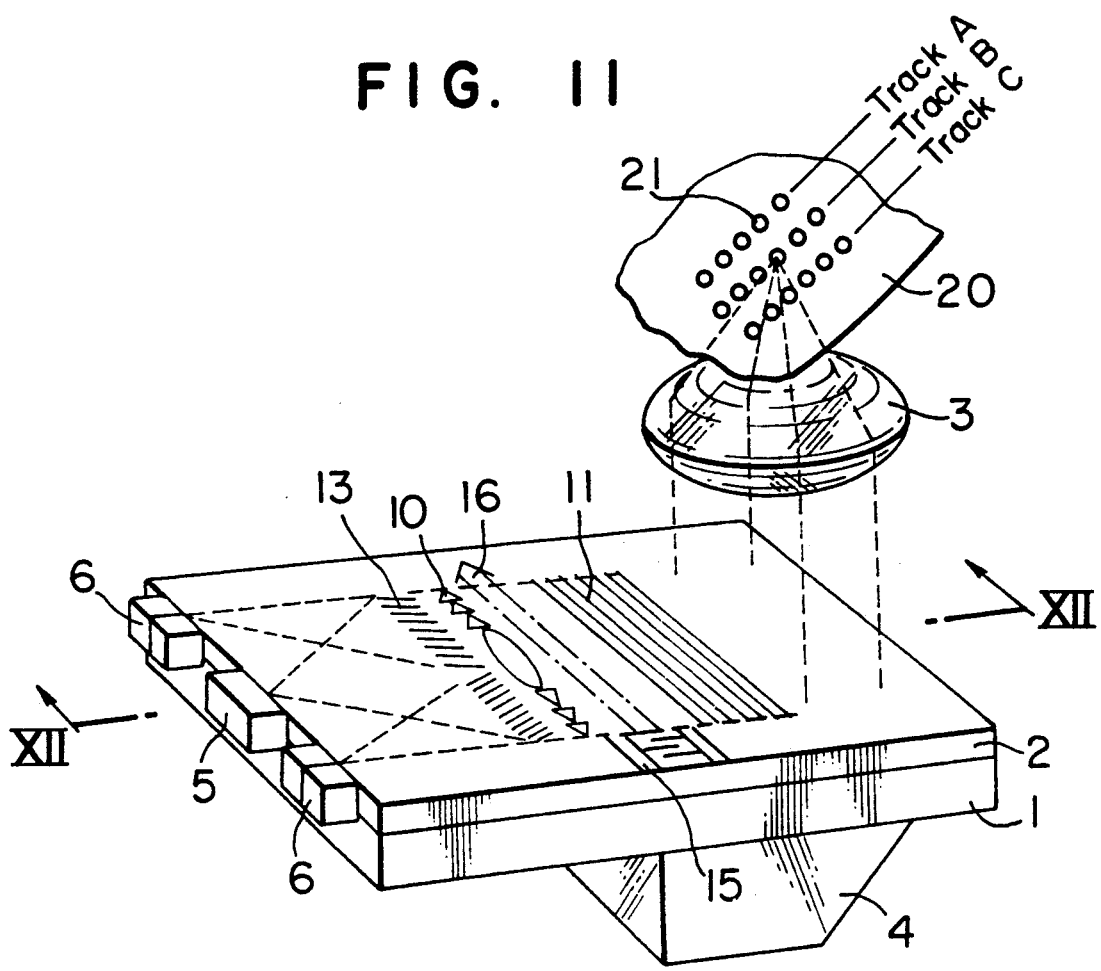
FIG. 11 is a perspective view of a different embodiment of the present invention.
Figure 12:
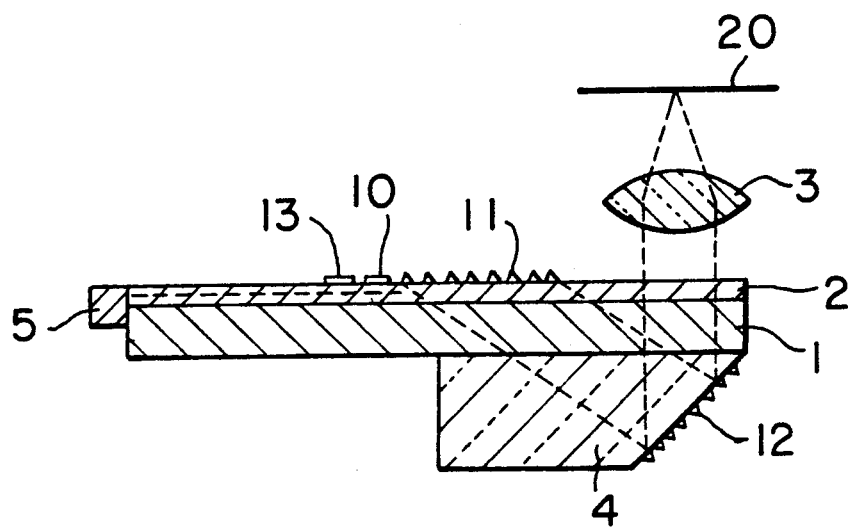
FIG. 12 is a sectional view taken along the line XII—XII of FIG. 11.

A different embodiment of the invention will be described with reference to FIG. 11 which is a perspecrive view and FIG. 12 which is a sectional view taken along the line XII—XII of FIG. 11. Referring to these Figures, a light beam emitted from a semiconductor laser 5 is made incident to a waveguide 2 which is disposed in contact with or in the close proximity of a substrate 1, so as to become a guided light wave. The beam is substantially collimated by the effect of a waveguide type lens 10. The guided light wave is deflected by surface elastic waves or surface acoustic waves 16 from surface elastic wave generating electrodes 15 and is made to emerge from the surface of the waveguide 2 faced to the substrate 1, by the effect of a first diffraction grating 11. The emergent beam is then diffracted and deflected by the effect of a second diffraction grating 12 which is of reflection type and provided on the surface of a modified prism 4 disposed in contact with or in the close proximity of the substrate, and is made to impinge upon a lens 3 so as to be focused on the optical information medium 20, thereby enabling to read information from pits 21 formed in the surface of the medium 20. The light reflected by the optical information medium 20 is made to trace the same optical path in the reverse direction and is deflected by the action of a beam splitter 13 to impinge upon a plurality of photodetectors 6 for photoelectric conversion. The thus converted signals are processed by a suitable electrical signal processing circuit, whereby elecrrical signals corresponding to the optical information are produced. The lens 3 may be substituted by a diffraction type lens 14 which is disposed on or in the close proximity of the surface of the waveguide shown in FIG. 9.

Figure 13:
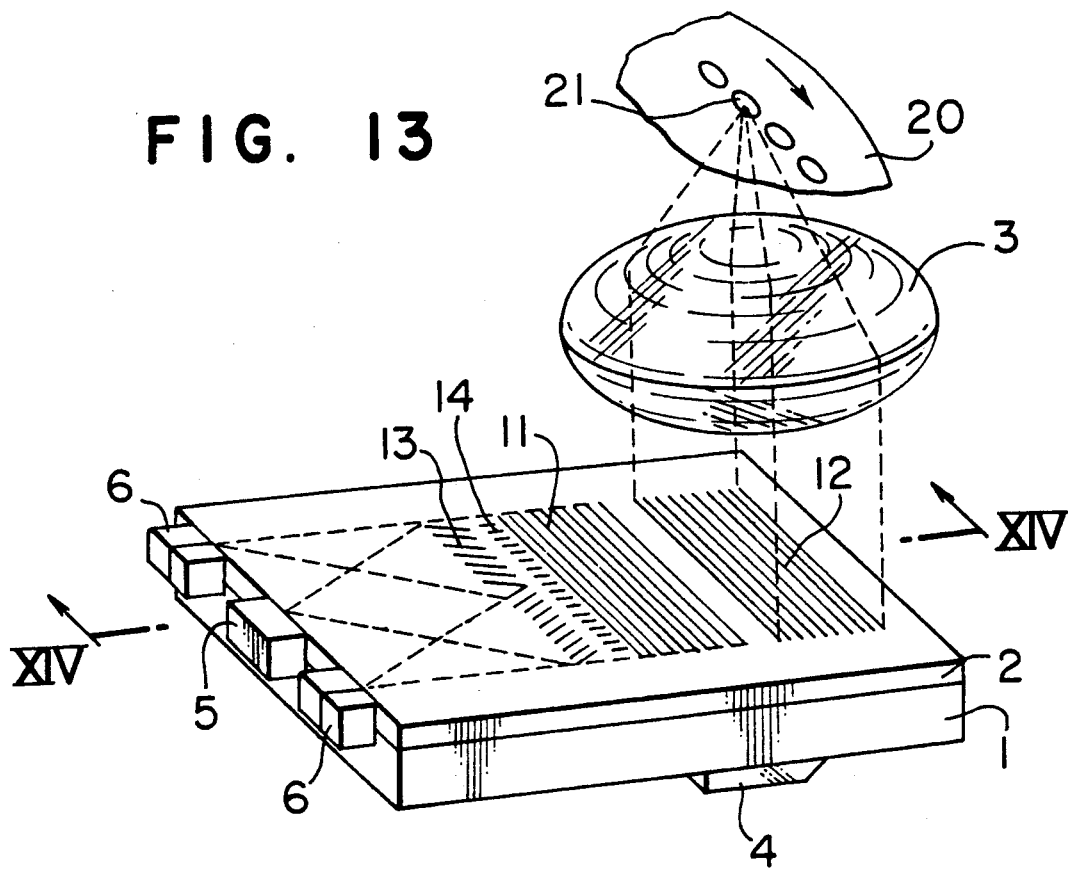
FIG. 13 is a perspective view of a different embodiment of the present invention.
Figure 14:
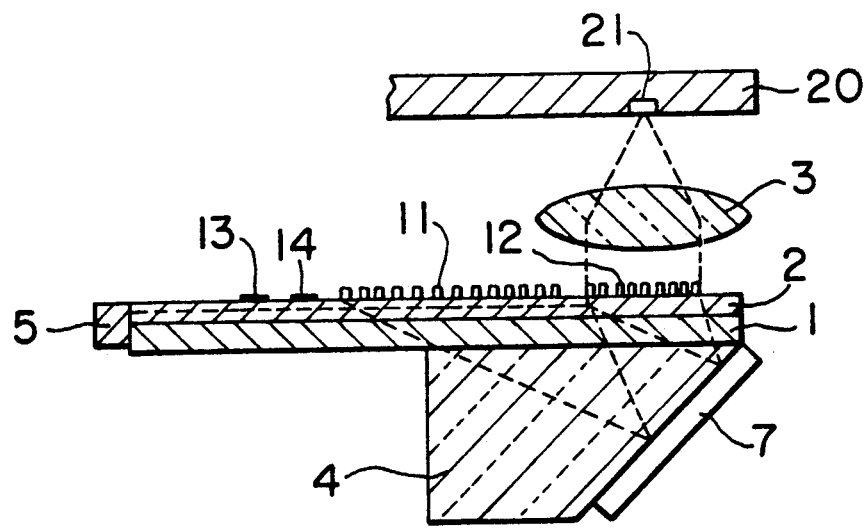
FIG. 14 is a sectional view taken along the line XIV—XIV of FIG. 13.

This imbodiment offers an advantage in that the angle of deflection of the beam can be varied by varying the frequency of the surface elastic or acoustic wave 16. This enables the beam to make access to any one of a multiplicity of tracks such as tracks A, B, C and so forth formed on the optical information medium 20 without the aid of any mechanical moving part, thus contributing to improvement in the reliability and access speed, A different embodiment of the invention will be described with reference to FIG. 13 which is a perspective view and FIG. 14 which is a sectional view taken along the line XIV—XIV of FIG. 13. Referring to these Figures, a light beam emitted from a semiconductor laser 5 is made incident to a waveguide 2 which is disposed in contact with or in the close proximity of a substrate 1, so as to become a guided light wave. The beam is substantially collimated by the effect of a waveguide type lens 14. The guided light wave is made to emerge from a surface of the waveguide 2 faced to the substrate 1, by the effect of a first diffraction grating 11. The emergent beam is then reflected by a reflecting layer 7 ided on the surface of a modified prism 4 disposed in contact with or in the close proximity of the substrate 1, and is diffracted by a second diffraction grating 12. The diffracted light is made to impinge upon a lens 3 so as to be forcused at a point on the optical information medium 20, thereby enabling to information from pits 21 formed in the surface of the medium 20. The light reflected by the optical information medium 20 is made to trace the same optical path in the reverse direction so as to become guided light wave again, and is deflected by the action of a beam splitter 13 to impinge upon a pluralilty of light intensity detectors 6 for photoelectric conversion. The thus converted signals are processed by a suitable electrical signal processing circuit (not shown), whereby electrical signals corresponding to the optical information are produced.

This embodiment offers the following advantages. Namely, the thickness of the substrate can be minimized so as to enable economization of the substrate material, as well as reduction in the weight, because the modified prism can be formed as a member separate from the substrate.

In addition, the reduction of the overall height of the apparatus is made possible because the apparatus can be designed such that the light emitted from the second diffraction grating 12 is directed toward the optical information medium in a direction perpendicular to the substrate.

The first and second diffraction gratings may be of linear type which is much easier to produce than curvilinear type.

In addition, the production process is simplified by the virtue of the fact that the first diffraction grating and the second diffraction grating are formed on the same plane.

Figure 15:
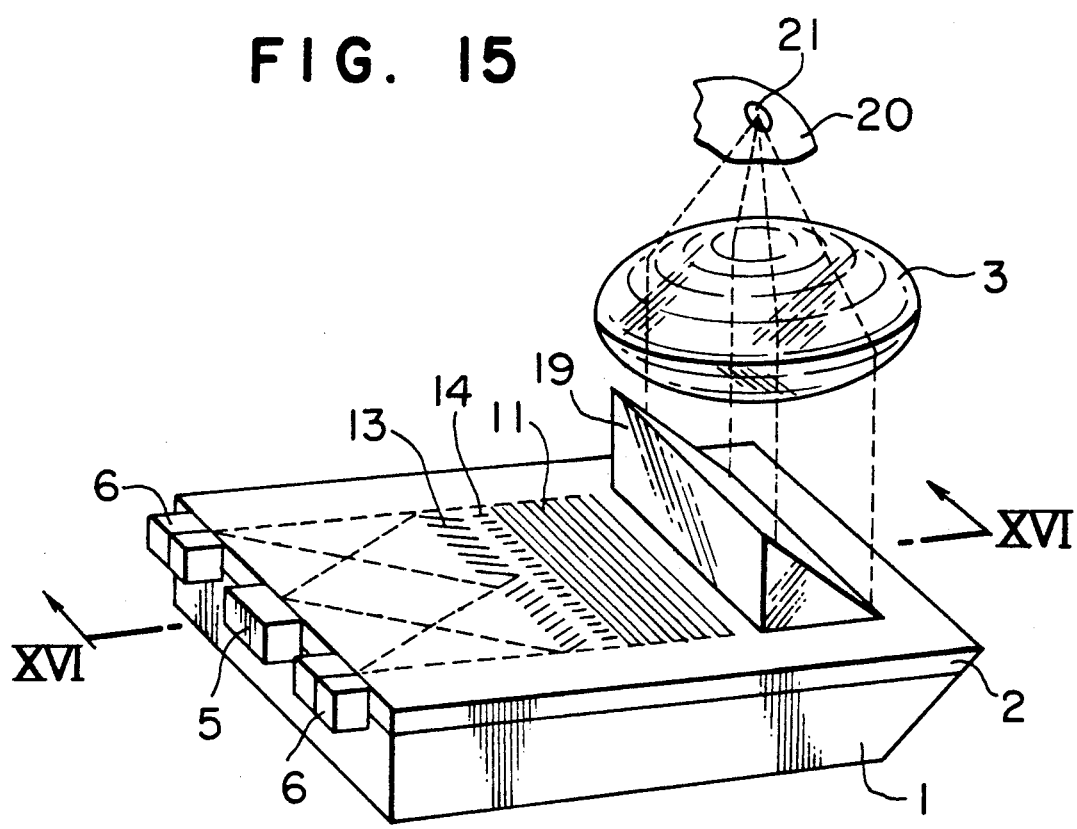
FIG. 15 is a perspective view of a different embodiment of the present invention.
Figure 16:
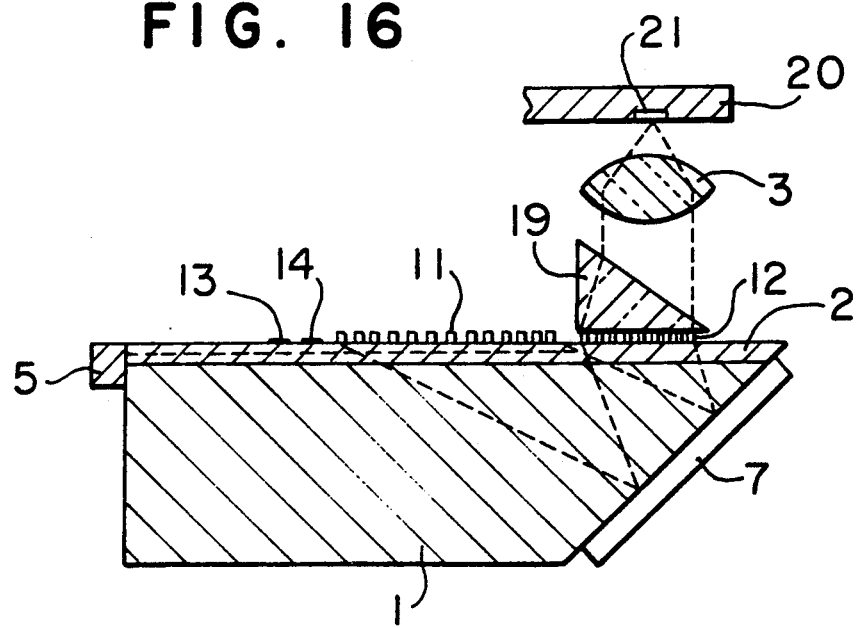
FIG. 16 is a sectional view taken along the line XVI—XVI of FIG. 15.

A different embodiment of the invention will be described with reference to FIG. 15 which is a perspective view and FIG. 16 which is a sectional view taken along the line XVI—XVI of FIG. 15. Referring to these Figures, a beam emitted from a semiconductor laser 5 is made incident to a waveguide 2 which is disposed in contact with or in the close proximity of a substrate 1, so as to become a guided light wave. The guided light wave is then substantially collimated by the effect of a waveguide type lens 14 and is made to emerge from the waveguide 2 by the effect of a first diffraction grating 11. The emergent beam is reflected by a reflecting layer 7 and is then diffracted by the effect of a second diffraction grating 12. The diffracted beam is deflected by the effect of a prism 19 and is condensed by the action of the lens 3 so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13 to impinge upon a plurality of light intensity detectors 6. The outputs from the detectors 6 are processed by a suitable electrical signal processing circuit(not shown), whereby electrical signals corresponding to the optical information are produced.

This embodiment offers the following advantage. Greater degrees of freedom are obtained in the design of the first and second diffraction gratings 11, 12, by suitable selection of the apex angle of the prism 19, so that the design factors such as the grating pitch and so forth can be determined more freely so as to facilitate the production of the apparatus. In addition, it is possible to design the apparatus such that the light beam from the prism 19 is directed towards the optical information medium 20 in a direction perpendicular to the substrate, thus reducing the overall height of the apparatus. In addition, the grating coupler 11 and the second diffraction grating 12 can be of linear type. Since the first and the second diffraction gratings can be formed on the same plane, the production process can be simplified.

The prism 19 used in this embodiment may have a curved surface.

Figure 17:
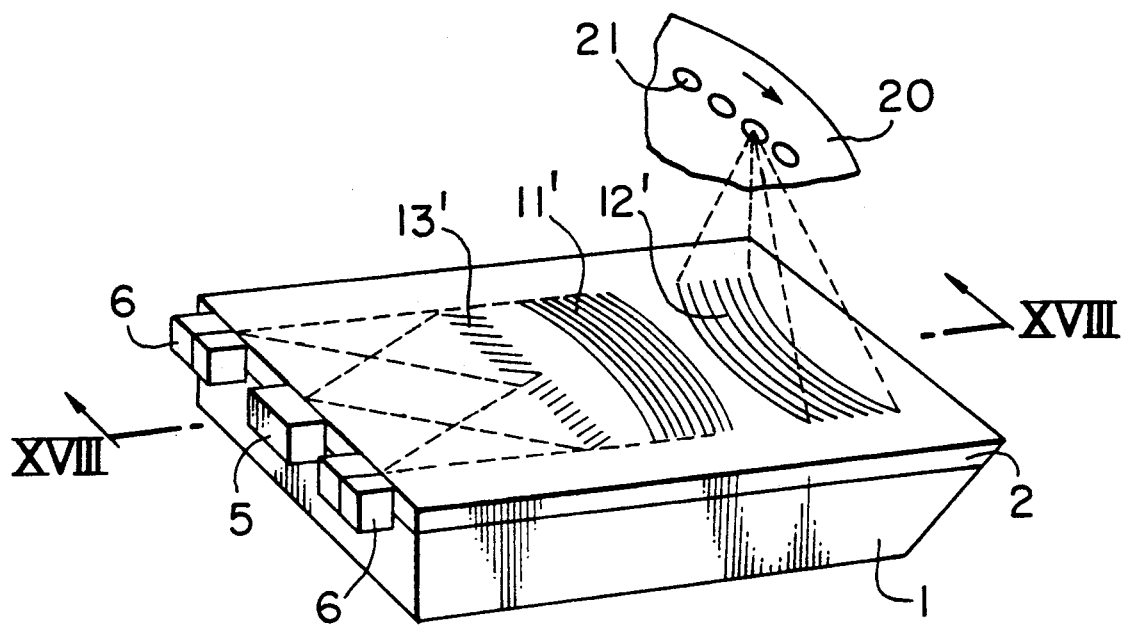
FIG. 17 is a perspective view of a different embodiment of the present invention.
Figure 18:
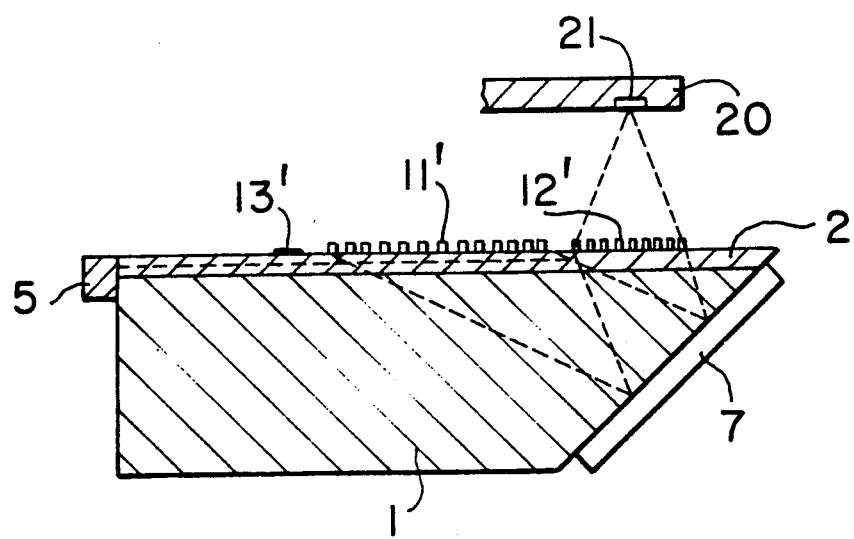
FIG. 18 is a sectional view taken along the line XVIII—XVIII of FIG. 17.

A different embodiment of the invention will be described with reference to FIG. 17 which is a perspective view and FIG. 18 which is a sectional view taken along the line XVIII—XVIII of FIG. 17. Referring to these Figures, a beam emitted from a semiconductor laser 5 is made incident to a waveguide 2 and is made to emerge therefrom by the effect of a first diffraction grating 11' having a curved form. The emergent beam is reflected by a reflecting layer 7 and is then diffracted by the effect of a second diffraction grating 12' having a curved form, so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13' to impinge upon a plurality of light intensity detectors 6. The outputs from the detectors 6 are processed by a suitable electrical signal processing circuit(not shown), whereby electrical signals corresponding to the optical information are produced.

This embodiment eliminates the necessity of providing the lens which substantially collimates the guided light wave, as well as the condenser lens, thus contributing to a reduction in the number of parts. In addition, it is easy to reduce the overall height of the apparatus because the apparatus can be designed such that the light beam from the diffraction grating 12' is directed to the optical information medium in a direction perpendicular to the substrate.

Figure 19:
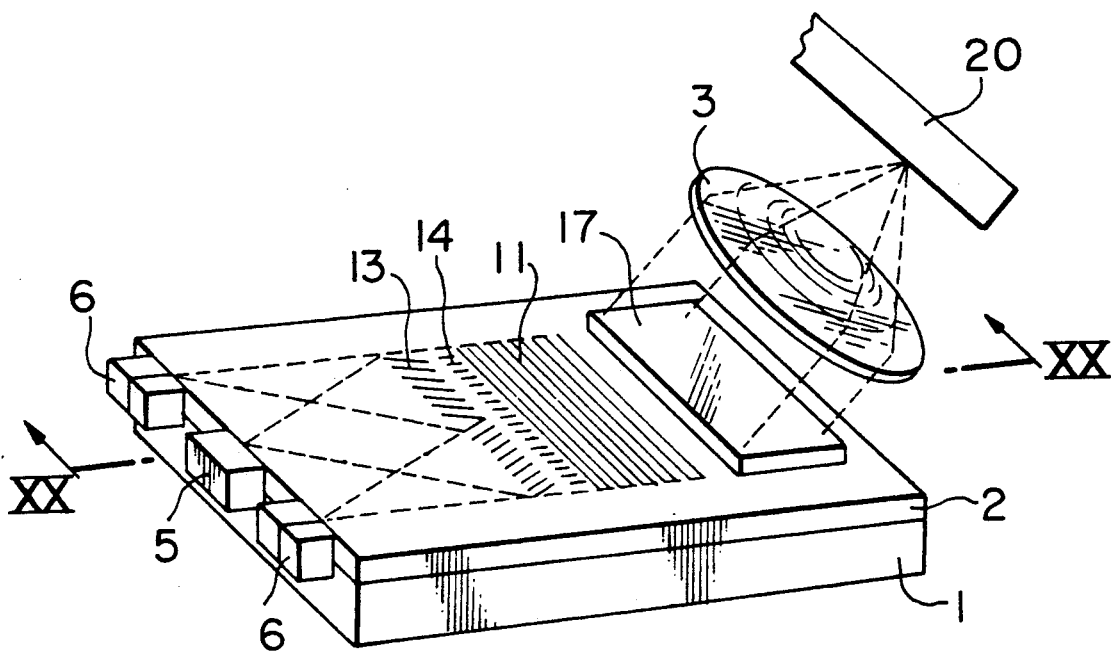
FIG. 19 is a perspective view of a different embodiment of the present invention.
Figure 20:
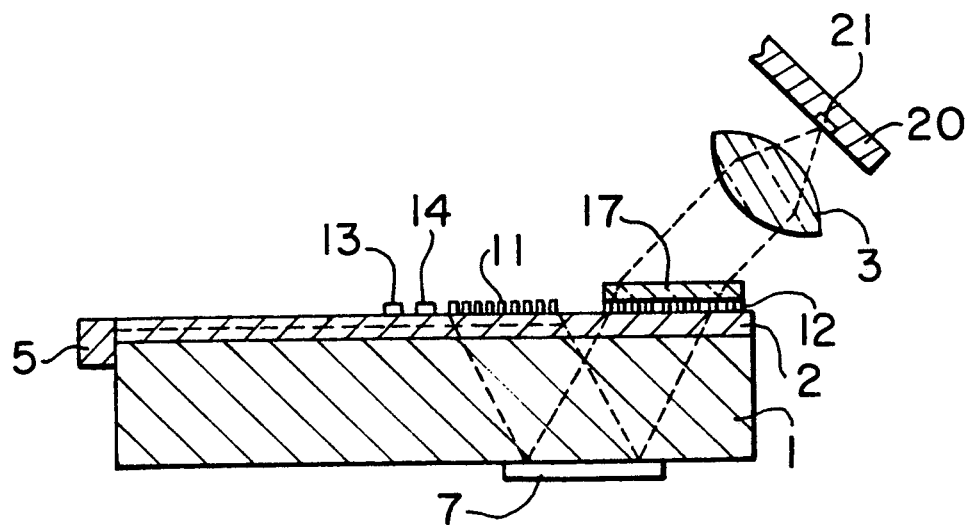
FIG. 20 is a sectional view taken along the line XX—XX of FIG. 19.

A different embodiment of the invention will be described with reference to FIG. 19 which is a perspective view and FIG. 20 which is a sectional view taken along the line XX—XX of FIG. 19. Referring to these Figures, a beam emitted from a semiconductor laser 5 is made incident to a waveguide 2 so as to become a guided light wave. The guided light wave is substantially collimated by the effect of a waveguide type lens 14 and is made to emerge from the waveguide 2 by the effect of a first diffraction grating 11. The emergent beam is reflected by a reflection layer 7 which is disposed in contact with or in the close proximity of the revers or rear side of the substrate 1 and is then diffracted by a second diffraction grating 12. The diffracted beam is then made to pass through a high refractive index portion 17 which has a refractive index greater than that of the waveguide layer 2. The beam is then coverged by the action of a condenser lens 3 so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13 to impinge upon a plurality of light intensity detectors 6. The outputs from the detectors 6 are processed by a suitable electrical signal processing circuit(not shown), whereby electrical signals corresponding to the optical information are produced.

This embodiment facilitates the production of the apparatus because there is no part which is oblique to the waveguide layer 2. In addition, the first and second diffraction gratings 11, 12 can be of linear type. The high refractive index portion 17 used in this embodiment may have a curved surface.

A different embodiment of the invention will be described with reference to FIG. 21 which is a perspective view and FIG. 22 which is a sectional view taken along line XXII—XXII of FIG. 21. Referring to these Figures, a beam emitted from a semiconductor laser 5 is made incident to a waveguide 2 so as to become a guided light wave. The guided light wave is substantially collimated by the effect of a waveguide type lens 14 and is made to emerge from the waveguide 2 by the effect of a first diffraction grating 11. The emergent beam is reflected by a reflection layer 7 which is disposed in contact with or in the close proximity of the reverse or rear side of the substrate 1 and is then diffracted by a second diffraction grating 12. The diffracted beam is then deflected by a prism 19 and is then converged by the action of a condenser lens 3 so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13 to impinge upon a plurality of light intensity detectors 6. The outputs from the detectors 6 are processed by a suitable electrical signal processing circuit(not shown), whereby electrical signals corresponding to the optical information are produced.

This embodiment enables the direction of the beam from the prism 19 to be directed towards the optical information medium 20 at any desired angle, by suitable selection of the apex angle of the prism 19.

Figure 23:
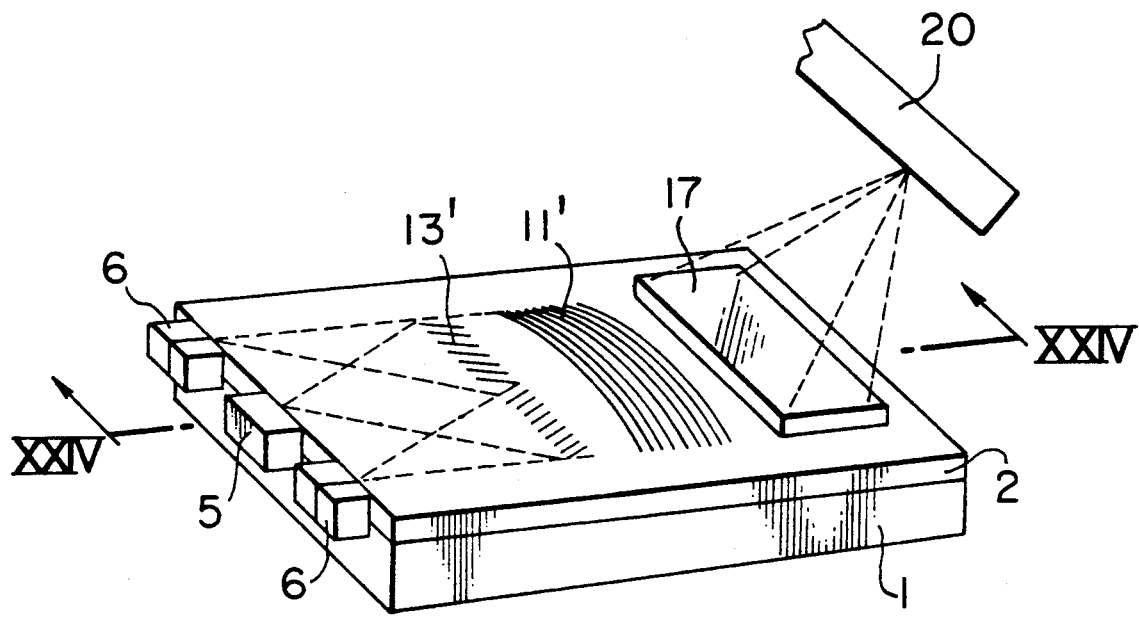
FIG. 23 is a perspective view of a different embodiment of the present invention.
Figure 24:
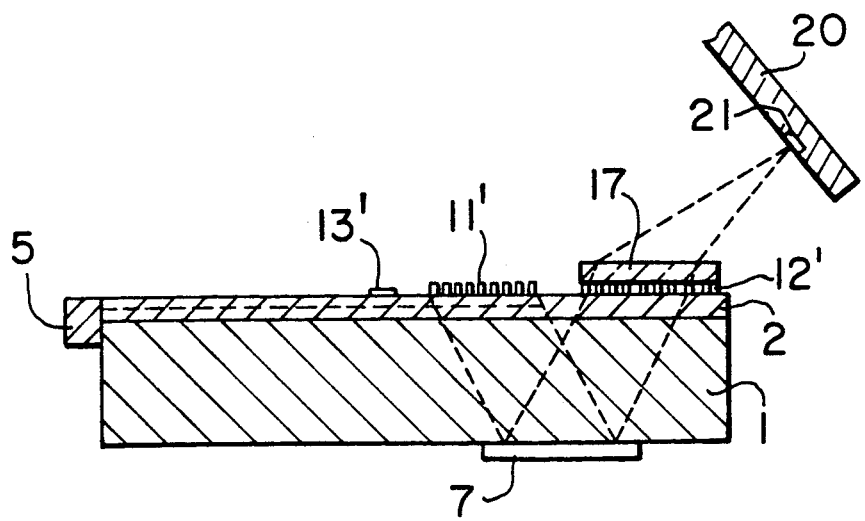
FIG. 24 is a sectional view taken along the line XXIV—XXIV of FIG. 23.

A different embodiment of the invention will be described with reference to FIG. 23 which is a perspective view and FIG. 24 which is a sectional view taken along the line XXIV—XXIV of FIG. 23. Referring to these Figures, a beam emitted from a semiconductor laser 5 is made incident to a waveguide 2 so as to become a guided light wave. The guided light wave is made to emerge from the waveguide 2 by the effect of a first diffraction grating 11' having a curved configuration. The emergent beam is reflected by a reflection layer 7 which is disposed in contact with or in the close proximity of the reverse or rear side of the substrate 1 and is then diffracted by a second diffraction grating 12'. The diffracted beam is then made to pass through a high refractive index portion 17 having a refractive index greater than that of the waveguide layer, and is focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13' to impinge upon a plurality of light intensity detectors 6. The outputs from the detectors 6 are processed by a suitable electrical signal processing circuit(not shown), whereby electrical signals corresponding to the optical information are produced.

This embodiment facilitates the production of the apparatus thanks to the elimination of part oblique to the waveguide layer 2. In addition, the waveguide type lens and the ocndenser lens are not required.

Figure 21:
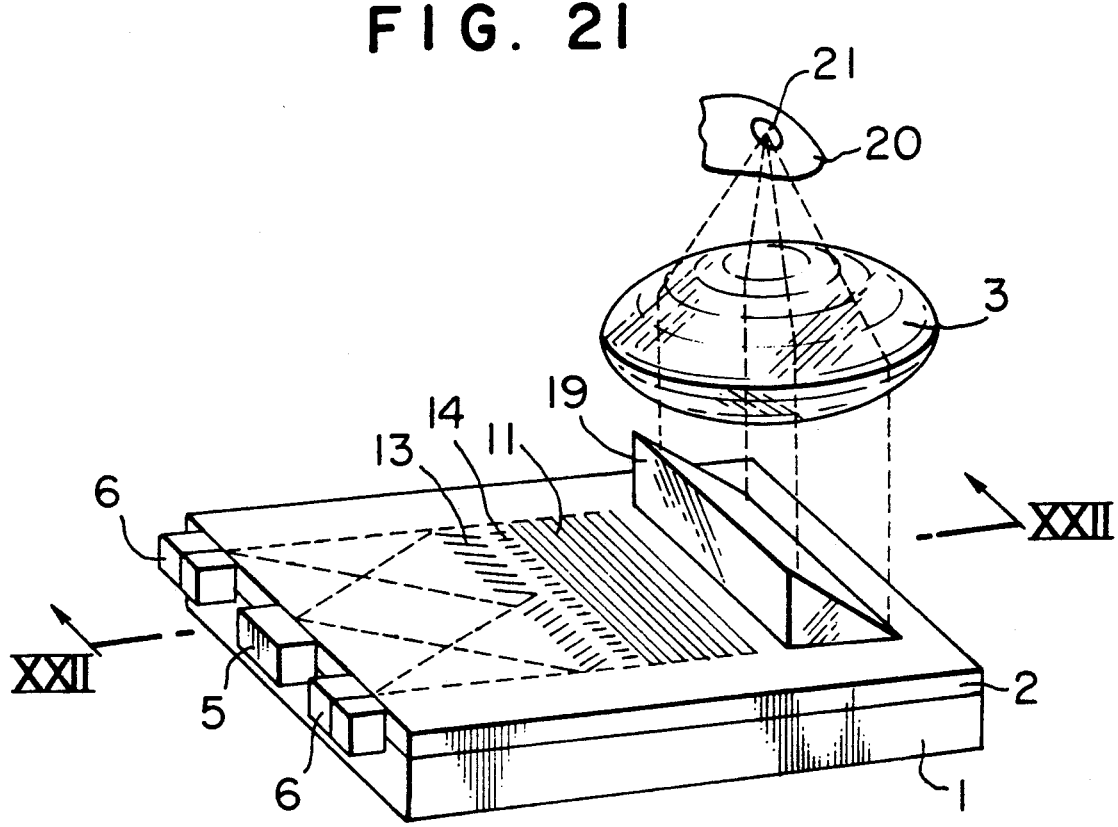
FIG. 21 is a perspective view of a different embodimet of the present invention.
Figure 22:
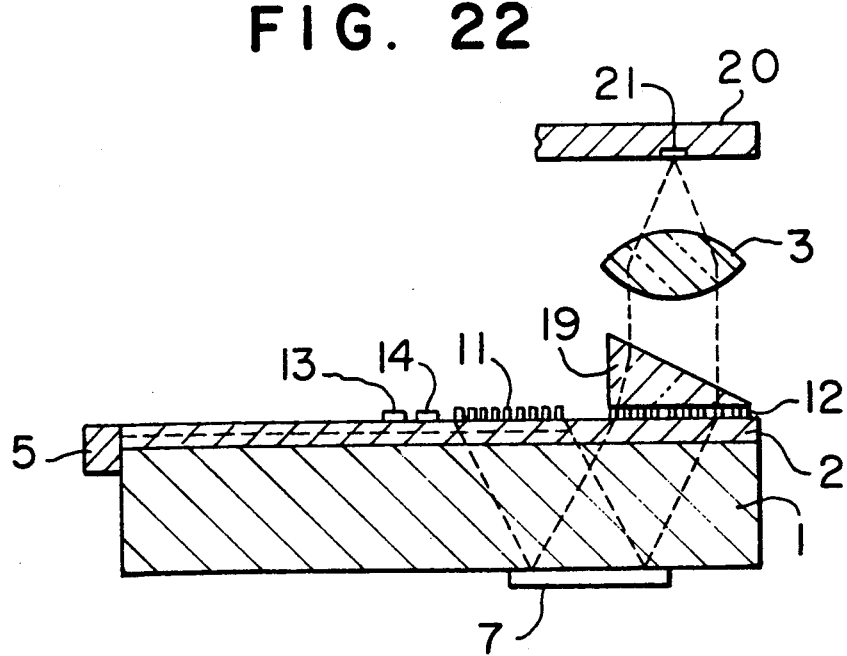
FIG. 22 is a sectional view taken along the line XXII—XXII of FIG. 21.

The high refractive index portion 17 used in this embodiment may be substituted by a prism 19 of the type shown in FIG. 21.

Figure 25:
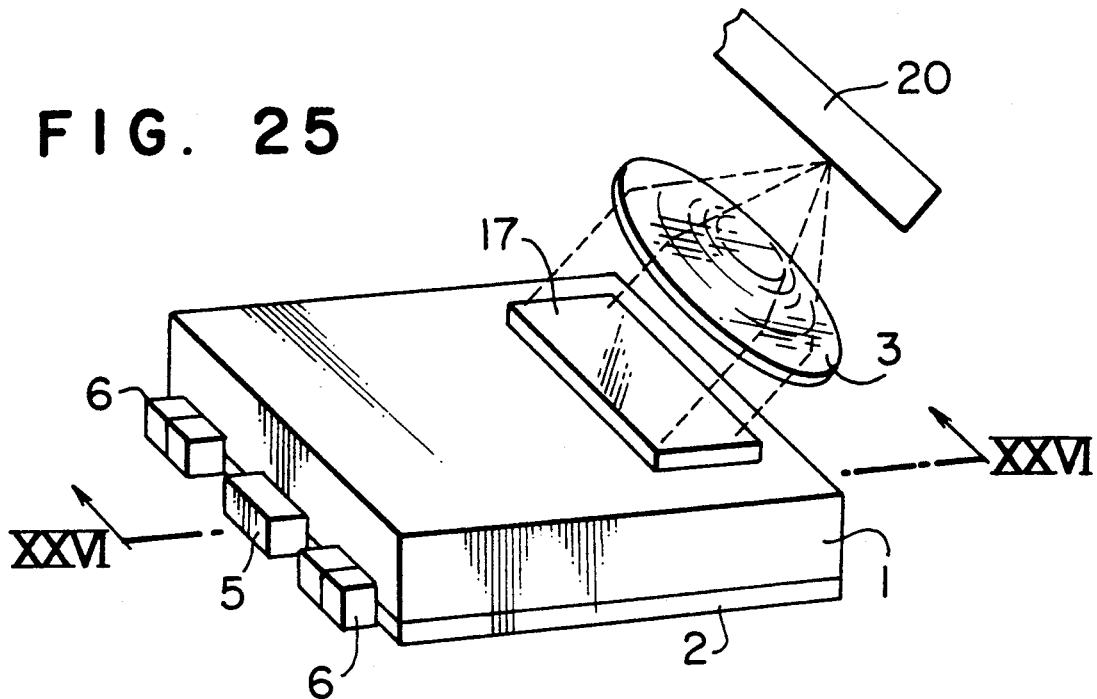
FIG. 25 is a perspective view of a different embodiment of the present invention.
Figure 26:
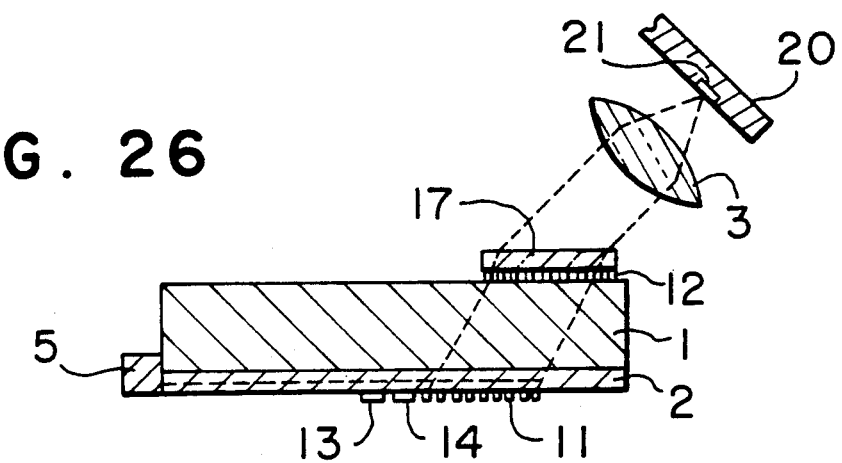
FIG. 26 is a sectional view taken along the line XXVI—XXVI of FIG. 25.
Figure 27:
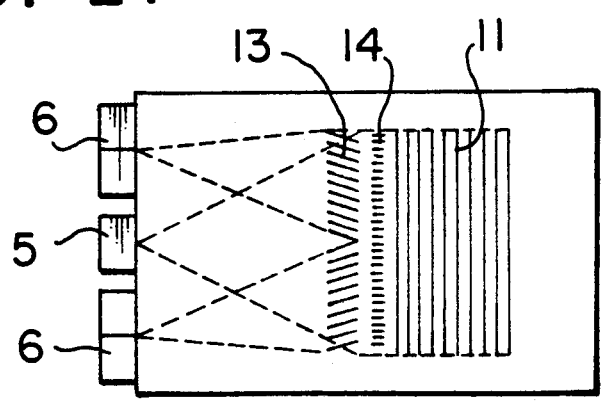
FIG. 27 is a bottom plan view of the embodiment shown in FIG. 25.

A different embodiment of the invention will be described with reference to FIG. 25 which is a perspective view and FIG. 26 which is a sectional view taken along the line XXVI—XXVI of FIG. 25, and also to FIG. 27 which is a bottom plan view of the embodiment shown in FIG. 25. Referring to these Figures, a beam emitted from a semiconductor laser 5 is made incident to a waveguide 2 so as to become a guided light wave. The guided light wave is substantially collimated by the effect of a waveguide type lens 14 and is then made to emerge from the waveguide layer 2 by the effect of a first diffraction grating 11. The emergent beam is diffracted by a second diffraction grating 12 and is made to pass through a high refractive index portion 17 having a refractive index greater than that of the waveguide layer 2. The beam is then converged by a condenser lens 3 so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13 to impinge upon a plurallity of light intensity detectors 6. The outputs from the detectors 6 are processed by a suitable electrical signal processing circuit (not shown), whereby electrical signals corresponding to the optical information are produced.

This embodiment facilitates the production of the apparatus thanks to the elimination of part oblique to the waveguide layer 2.

Figure 28:
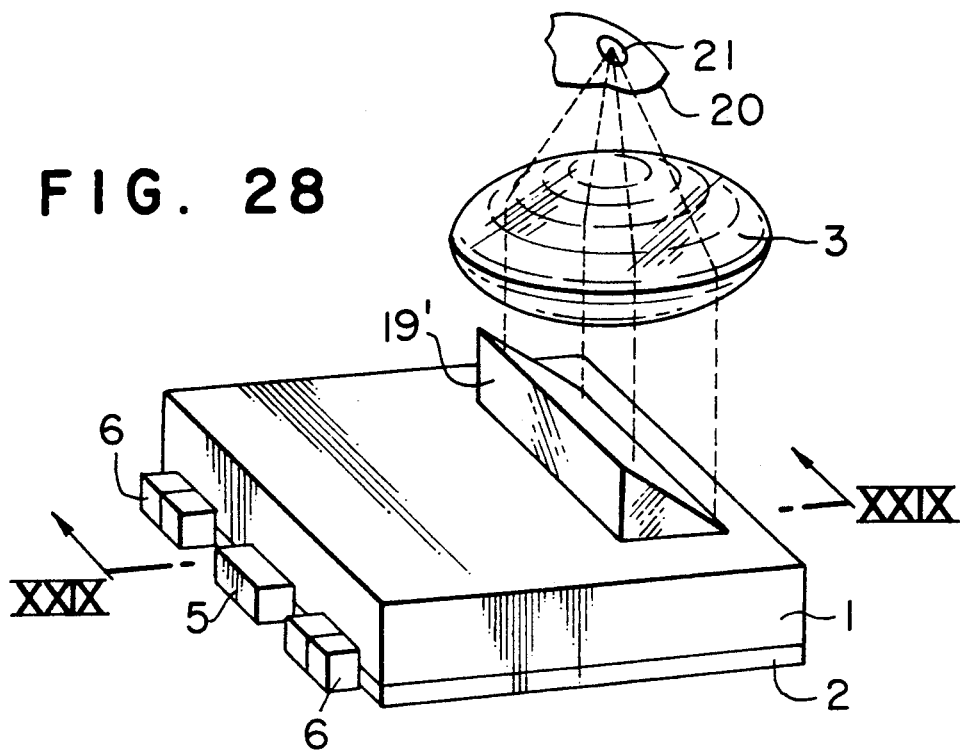
FIG. 28 is a perspective view of a different embodiment of the present invention.
Figure 29:
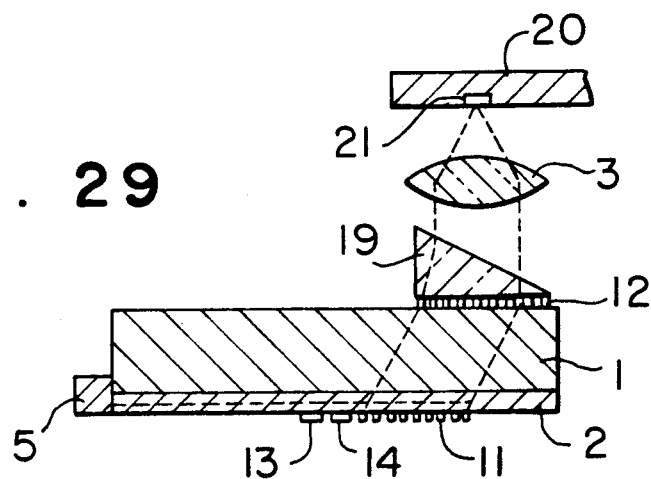
FIG. 29 is a sectional view taken along the line XXIX—XXIX of FIG. 28.
Figure 30:
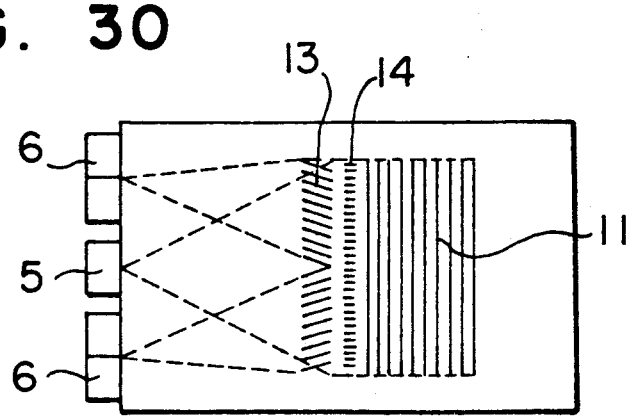
FIG. 30 is a bottom plan view of the embodiment shown in FIG. 28.

A different embodiment of the invention will be described with reference to FIG. 28 which is a perspective view and FIG. 29 which is a sectional view taken along the line XXIX—XXIX of FIG. 28, and also to FIG. 30 which is a bottom plan view of the embodiment shown in FIG. 28. Referring to these Figures, a beam emitted from a semiconductor laser 5 is made incident to a waveguide 2 so as to become a guided light wave. The guided light wave is substantially collimated by the effect of a waveguide type lens 14 and is then made to emerge from the waveguide layer 2 by the effect of a first diffraction grating 11. The emergent beam is diffracted by a second diffraction grating 12 and is deflected by a prism 19. The beam is then converged by a condenser lens 3 so as to be focused on the optical information medium 20, thereby enabling to read information from pits 21 formed in the surface of the medium 20. The light reflected by the optical information medium 20 is made to trace the same optical path in the reverse direction so as to become a guided light wave again and is split by the action of a beam splitter 13 to impinge upon a plurality of light intensity detectors 6. The outputs from the detectors 6 are processed by a suitable electrical signal processing circuit (not shown), whereby electrical signals corresponding to the optical information are produced.

This embodiment enables the beam to be emitted from the prism 19 towards the optical information medium 20 in a desired direction by a suitable selection of the apex angle of the prism 19.

A different embodiment of the invention will be described with reference to FIG. 31 which is a perspective view and FIG. 32 which is a sectional view taken along the line XXXII—XXXII of FIG. 31, and also to FIG.

Figure 31:
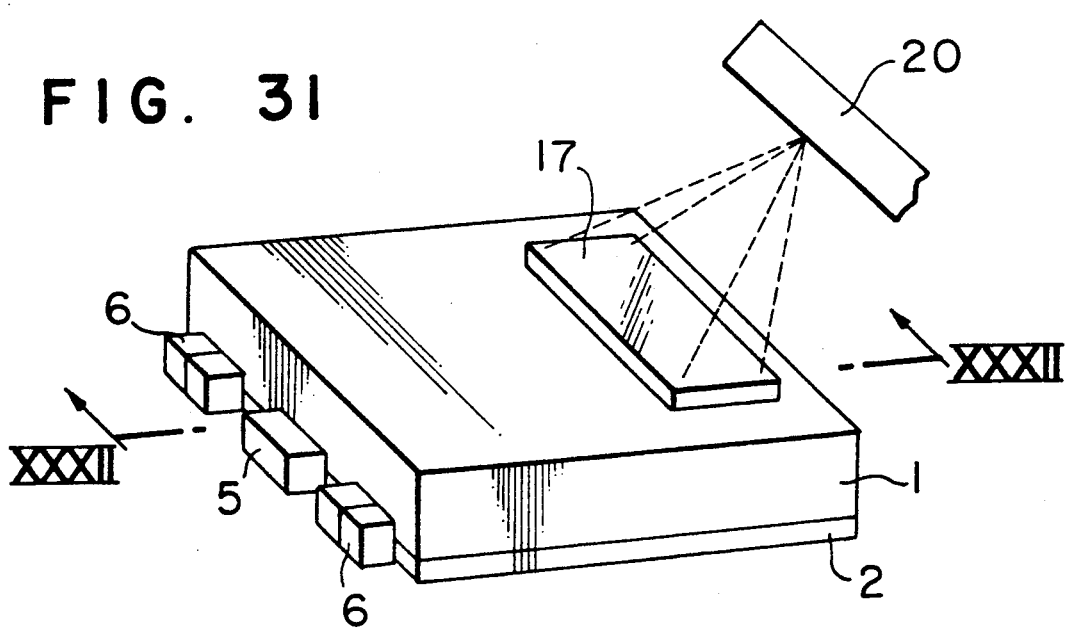
FIG. 31 is a perspective view of a different embodiment of the present invention.
Figure 32:
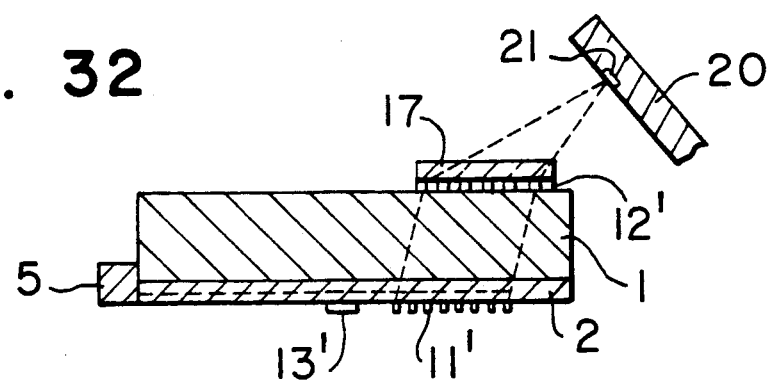
FIG. 32 is a sectional view taken along the line XXXII—XXXII of FIG. 31.
Figure 33:
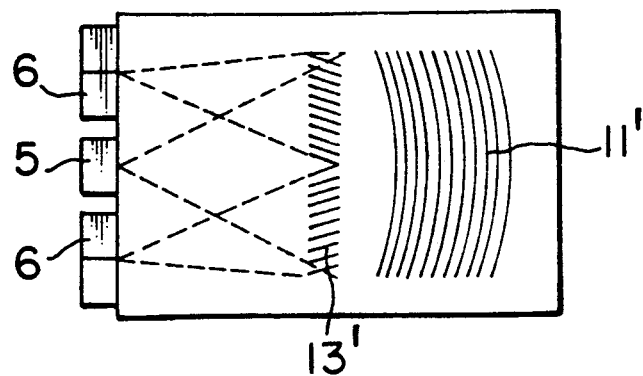
FIG. 33 is a bottom plan view of the embodiment shown in FIG. 31.

33 which is a bottom plan view of the embodiment shown in FIG. 31. Referring to these Figures, a beam emitted from a semiconductor laser 5 is made incident to a waveguide 2 so as to become a guided light wave. The guided light wave is made to emerge from the waveguide 2 by the effect of a grating coupler (first diffraction grating) 11'. The emergent beam is diffracted by a second diffraction grating 12' and is made to pass through a high refractive index portion 17 having a refractive index greater than that of the waveguide layer 2, and is then focused on the optical information medium 20, thereby enabling to read information from pits 21 formed in the surface of the medium 20. The light reflected by the optical information medium 20 is made to trace the same optical path in the reverse direciton so as to become a guided light wave again and is split by the action of a beam splitter 13 to impinge upon a plurality of light intensity detectors 6. The outputs from the detectors 6 are processed by a suitable electrical signal processing circuit (not shown), whereby electrical signals corresponding to the optical information are produced.

The high refractive index portion 17 in this embodiment may be substituted by a prism 19 of the type shown in FIG. 21.

This embodiment maybe modified such that a waveguide type lesn is disposed between the beam splitter 13' and the diffraction grating 11' so as to substantially collimate the guided light wave, thus enabling the use of a linear diffraction grating as the first diffraction grating 11. It is also possible to have a lens disposed between the second diffraction grating 12' and the optical information medium 20 so as to enable the use of a linear diffraction grating as the second diffraction grating 12'. Furthermore, the surface of the high refractive index portion 17 may be curved.

Figure 34:
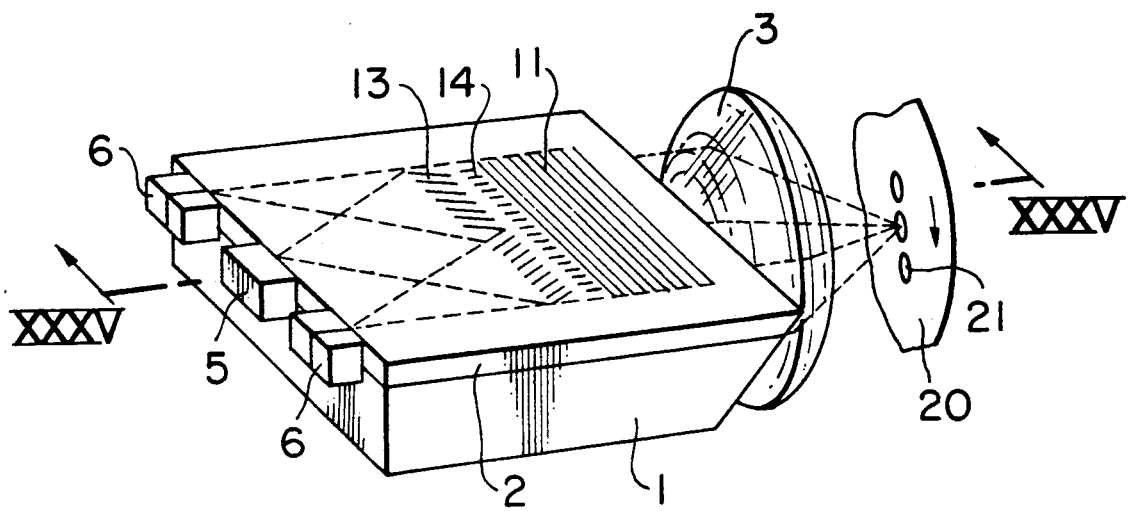
FIG. 34 is a perspective view of a different embodiment of the present invention.
Figure 35:
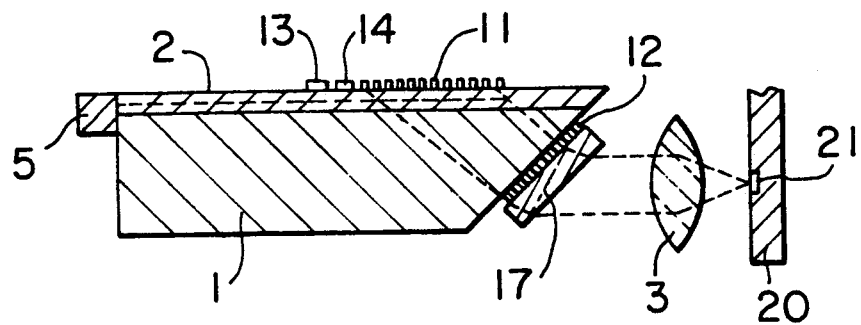
FIG. 35 is a sectional view taken along the line XXXV—XXXV of FIG. 34.

A different embodiment of the present invention will be described with reference to FIG. 34 which is a perspective view and FIG. 35 which is a sectional view taken along the line XXXV—XXXV of FIG. 34. A beam emitted from a semiconductor laser 5 is made incident to a waveguide layer 2 disposed in contact with or in the close proximity of a substrate 1, so as to become a guided light wave. The guided light wave is substantially collimated by the effect of a waveguide type lens 14 and is then made to emerge from the waveguide path 2 by the effect of a first diffraction grating 11. The emergent light beam is then diffracted by a second diffraction grating 12 and is then made to pass through a high refractive index portion 17 which has a greater refractive index than the waveguide layer. The beam is then converged by a lens 3 so as to be focused on an optical information medium 20, thereby enabling to read information from pits 21 in the medium 20. The light beam reflected by the medium 20 traces back the described path so as to become a guided light wave again, and is split by a condenser-type beam splitter 13 so as to impinge upon light intensity detectors 6. The outputs from the detectors 6 are processed by an electrical signal processing circuit (not shown), whereby electrical signals corresponding to the optical information are produced. The surface of the high refractive index portion 17 may be curved.

Figure 36:
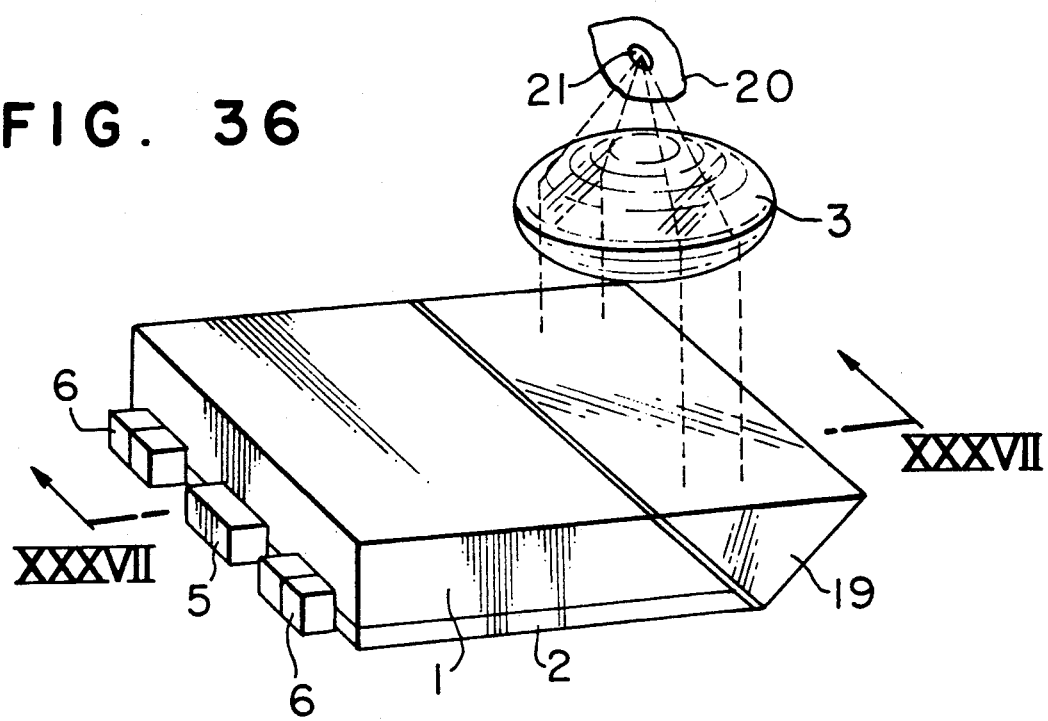
FIG. 36 is a perspective view of a different embodiment of the present invention.
Figure 37:
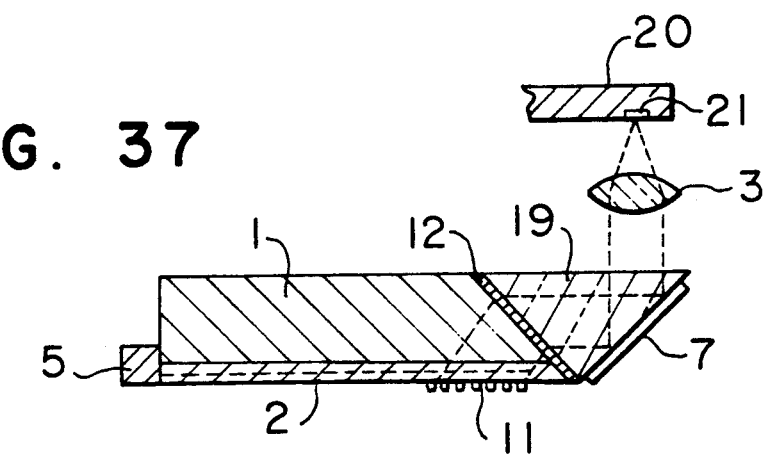
FIG. 37 is a sectional view taken along the line XXXVII—XXXVII of FIG. 36.
Figure 38:
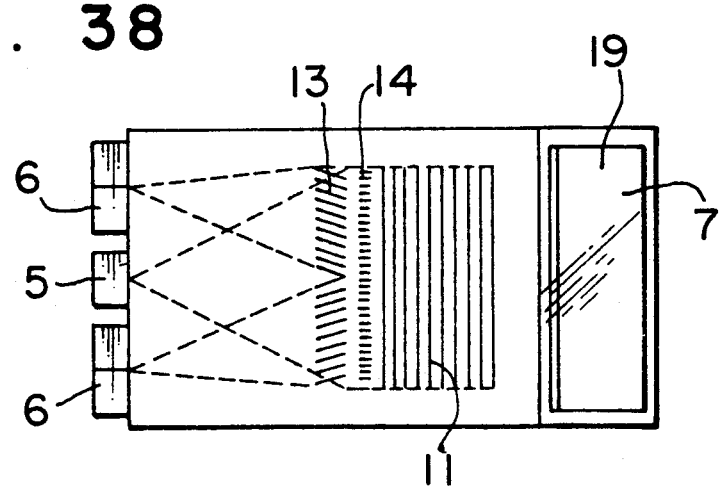
FIG. 38 is a bottom plan view of the embodiment shown in FIG. 36.

A different embodiment of the present invention will be described with reference to FIG. 36 which is a perspective view, FIG. 37 which is a sectional view taken along the line XXXVII—XXXVII of FIG. 36 and FIG. 38 which is a bottom plan view of the embodiment shown in FIG. 36. Referring to these Figures, a beam emitted from a semiconductor laser 5 is made incident to a waveguide layer 2 which is disposed in contact with or in the close proximity of a substrate 1, so as to become a guided light wave. The guided light wave is substantially collimated by the effect of a waveguide type lens 14 and is then made to emerge from the waveguide 2 by the effect of a first diffraction grating 11. The emergent beam is then diffracted by a second diffraction grating 12 and is further reflected by a prism 19. The beam is then converged by the effect of a lens 3 so as to be focused on an optical information medium 20 thereby enabling to read optical information from pits 21 formed on the medium 20. The light beam reflected by the medium 20 traces back the same path of light so as to become a guided light wave again. The guided light wave is then split by the effect of a condenser-type beam splitter 13 and is made to impinge upon light intensity detectors 6. The outputs from the detectors 6 are processed by an electrical signal processing circuit (not shown) whereby electrical signals corresponding to the optical information are produced.

This embodiment enables the direction of the light beam from the prism 19 towards the optical information medium 20 to be determined as desired by selection of the apex angle of the prism 19. In addition, it is possible to use linear diffraction gratings as the first and second diffracton gratings 11 and 12.

In the embodiments described hereinbefore, the reflection layer 7 may be formed of a material which has a sufficiently large reflectivity to lights of normally-used wavelengths, e.g., a metal, a dielectric thin film or layer, a multi-layered dielectric thin film or layer, and so forth. The reflection layer 7 may be substituted by efficient use of total reflection which occurs when the light beam is incident at an angle greater than the critical angle.

The waveguide type lens 14 used in some of the described embodiments may be a mode-index type lens (where the refractive index in the waveguide layer is varied locally), a luneburg lens, a geodesic lens, a diffraction-type lens grating lens, reflection type grating lens or the like. The grating coupler and the diffraction grating 11 and 12 may be of overlayer type, refractive index modulation type, and so forth.

In the embodiments described before, it is possible to stabilize the optical alignment between the optical integrated circuit and external lens, by fixing the external lens to the optical integrated circuit by means of a light-transmitting adhesive or fitting the lens support portion to the substrate of the optical integrated circuit.

Figure 39:
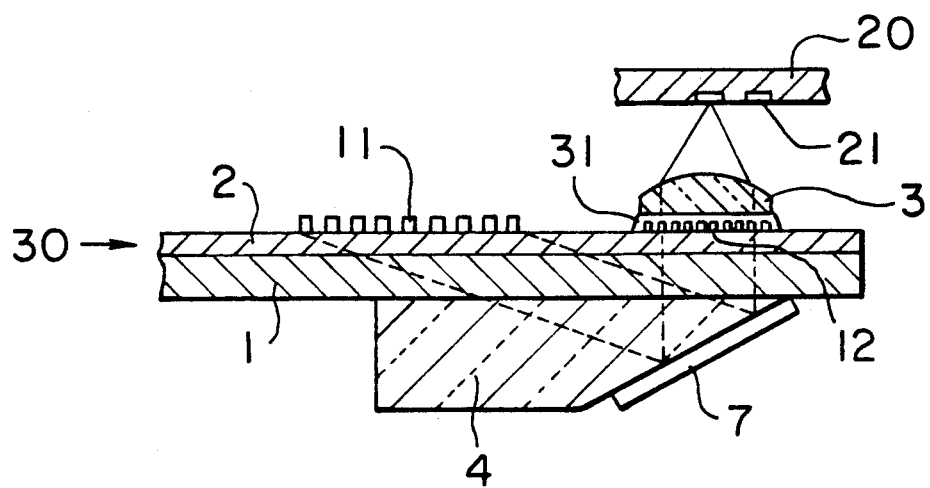
FIGS. 39 and 40 are illustration of different embodiments of the present invention.
Figure 40:
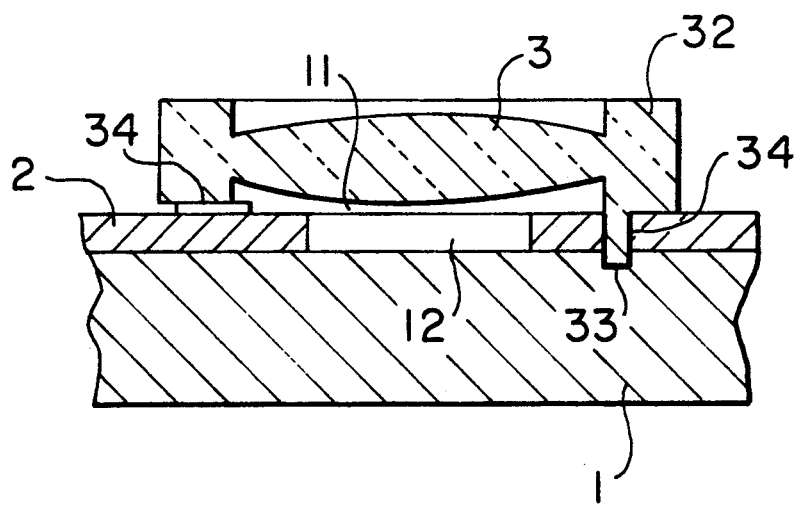

FIGS. 39 and 40 show arrangements for stabilizing the optical alignment between the optical integrated circuit and the external lens.

Referring to FIG. 39, a light beam 30 passes through a waveguide 2 which is formed on a substrate 1. The beam 30 emerges from a side of the waveguide 2 faced to an optical information medium 20 so as to become an emergent beam, by the effect of first and second diffraction gratings 11, 12. Various types of diffraction gratings such as brazing type, distributed index type and relief type can be used as the diffraction gratings 11 and 12. Alternatively, the light beam 30 may be converted into emergent light by the combination of any other type of diffraction gratings 11, 12. The emergent light is made to converge by the action of a lens 3 which is fixed to the waveguide surface by a light-transmitting adhesive 31, whereby the beam is focused at the focal point. According to this arrangment, it is possible to maintain the optical alignment between the second diffraction grating 12 and the lens 3 by a very simple construction. Although in the arrangement shown in FIG. 39 the lens in the form of separate member is fixed by means of an adhesive, the arrangement may be such that a light-transmitting and settable material such as an ultraviolet ray-setting resin is provided in the form of the lens in direct contact with the surface of the waveguide or the substrate.

FIG. 40 shows a different arrangement in which a lens assembly is fitted in a mating recess 33 formed in the surface of the substrate 1. More specifically, the lens 3 is supported by a lens supprt 32 having a projection 34 which is fittingly received in the recess 33 so that the lens 3 is made integral with the optical integrated circuit. The fitting portion is partly cutaway as at 34 in order to avoid disturbing the light beam 30 propagating through the waveguide 2.

Figure 42:
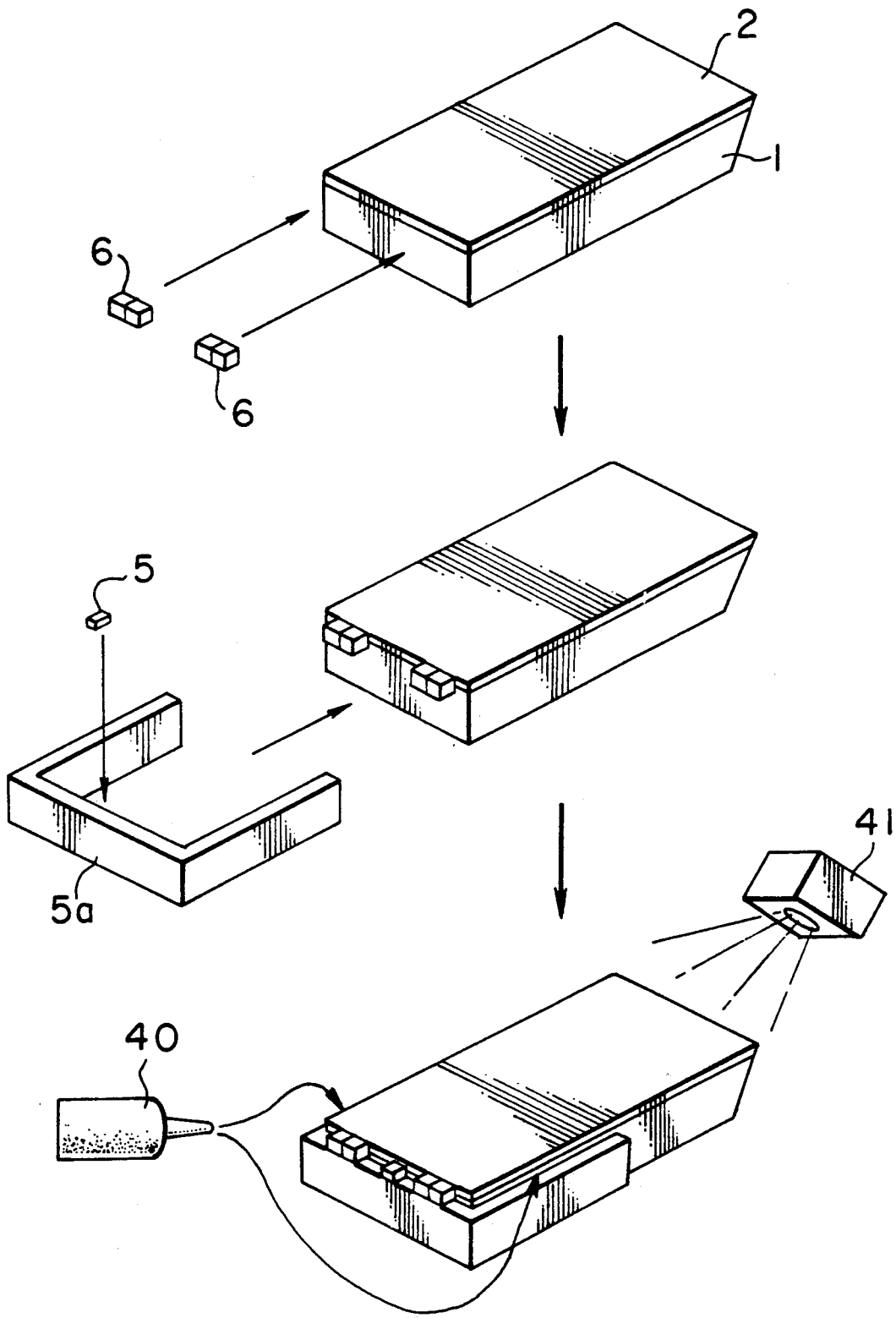
FIG. 42 is an illustration of the manner in which a photodetector and a semiconductor laser are fixed.

A description will be given of a method for fixing the photodetectors 6 and the semiconductor laser 5 in the described embodiments, with specific reference to FIG. 42.

The photodetectors 6 are fixed by adhesion to the substrate 1 which is provided with the waveguide layer 2. The fixing can be conducted by a simple adhesion operation provided that the adhesive used in adhesion is transparent to the light of wavelength used. The adhesion, however, may be effected by a different method such as welding by anodic bonding technique. Such a method provides a tight bonding, contributing to a high degree of reliability. Subsequently, a holder 5a to which the semiconductor laser 5 has been attached if fitted to the substrate 1 and is bonded to the same by means of an adhesive 40. Preferably, a beam of light such as visible rays, ultraviolet rays, infrared rays or other electromagnetic wave is from a light source 41 is irradiated onto the adhesive 40 so as to promote the setting of the adhesive 40, thereby to attain a high bonding strength and shorter setting time.

The holder 5a also serves as a heat sink for dissipating the heat generated by the semiconductor laser 5. A thermal expansion of the holder 5a is caused by the heat from the semiconductor laser 5. Usually, the waveguide layer 2 has a thickness of 1 μm or so, so that a large degradation in the optical performance may be caused even by a slight deviation of the position of the semiconductor laser 5 in the direction perpendicular to the waveguide layer 2. In the arrangement shown in FIG. 42, the holder has longitudinal axis parallel to the plane of the waveguide 2 so that major thermal deformation of the holder 5a takes place in the direction parallel to the plane of the waveguide 2, whereby the deviation of the laser position in the direction perpendicular to the waveguide layer 2 is minimized. In consequence, high optical performance can stably be maintained.

Figure 43:
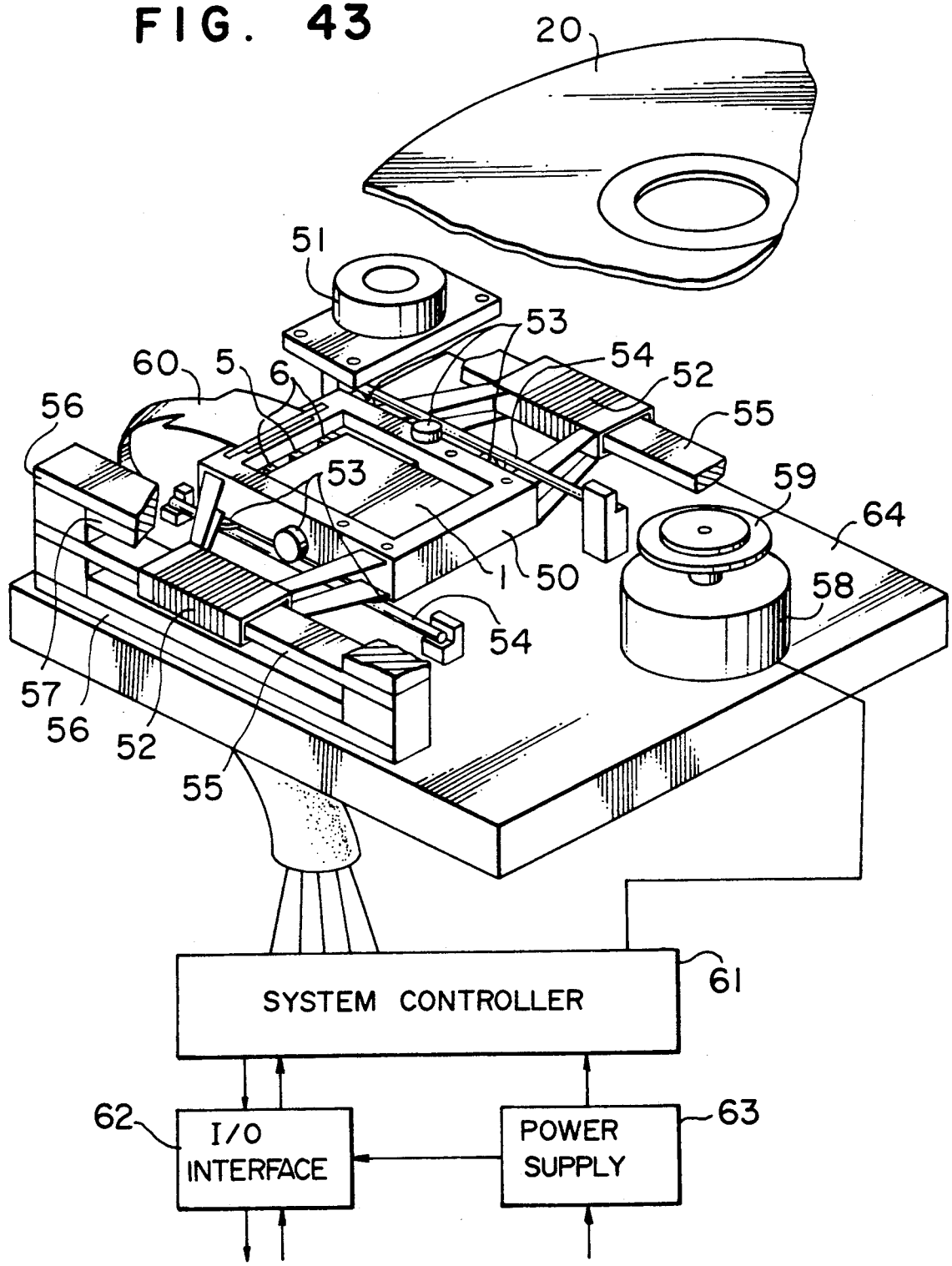
FIG. 43 is an illustration of an optical disk apparatus embodying the present invention.

An example of practical application of the present invention will be described with specific reference to FIG. 43 which shows an optical disk apparatus embodying the present invention. The apparatus has a housing 50. The optical integrated part including the components described hereinbefore such as the substrate 1, waveguide 2, semiconductor laser 5, optical detectors 6 and the first and second diffraction gratings is fixed to the housing 50 by suitable means such as adhesion, screws, caulking or pressing by springs. A lens actuator 51 is fixed to the housing 50 by means of, for example, screws. The lens actuator 51 has means for moving or displacing an incorporated object lens in the direction of the optical axis and, as desired, in directions perpendicular to the optical axis. An example of the lens actuator suitably used is a device which is shown in an article entitled "OPTICAL MEMORY SYSTEM" in the gazzette of "Special Seminar of Ultrafine Optics VI (1986) in "Symposium of Optical Engineering" of Society of Japanese Applied Physics, particularly in FIGS. 13 to 18 at page 127. A device disclosed in "Nikkei Mechanical". pp 60 to 67 (Nov. 8, 1982) may also be utilized.

the housing 50 is provided with a plurality of bearings 53 which cooperate with rails 54 on a base 64 so as to allow the housing 50 movable relative to the base 64. A voice coil 52 is secured to the housing 50. In operation, a magnetic field is applied to the voice coil 52 by means of a magnet 57 via magnetic circuit members 55, 56. Therefore, when electric current is supplied to the voice coil 52, a thrust is generated on the voice coil 52 to displace the housing 50. The components on the base 64 are connected to a system controller 61 through a flexible ribbon cable 60. The supply of electrical current or electric drive energy from the system controller 61 to the voice coil 52, lens actuator 51 and the semiconductor laser 5 is conducted through this flexible ribbon cable 60, while the signals from the photodetectors 6 are transmitted to the system controller 61 through the flexible ribbon cable 60.

A motor 58 mounted on the base 64 carries a table 59 for mounting an optical information medium 20 thereto.

The system controller 61 processes the signals from the photodetectors 60 so as to produce a read signal, a tracl error signal and a focus error signal. The read signal is delivered to an external device through an interface 62. The system controller 61 controls the driving power of the lens actuator 51 in accordance with focus error signal thereby correctly focusing of the beam. The system controller 61 also controls the driving power of the voice coil 52 and the driving power of the lens actuator 51 in accordance with the track error signal thereby enabling to execute tracking. The unit composed of the housing 50 and the optical integrated device carried by the housing 50 has a small weight so that the optical disk apparatus can operate with shorter access time and with reduced power consumption.

The driving power of the semiconductor laser 5 is modulated in accordance with writing signals delivered by an external device through the interface 62 and the system controller 61. The intensity of light applied to the optical information medium 20 is changed in accordance with the modulated power. The optical information medium 20 is made of a material which changes reflectivity in accordance with a change in the intensity of the light irradiated thereon, so that information is recorded by the modulated light beam applied to the medium 20 by the semiconductor laser 5.

Thus, an optical disk apparatus which is capable of conducting both reading and recording of information is obtained.

From the foregoing description, it will be understood that the present invention provides an optical information reading apparatus such as an integrated-optic disk pickup device which is capable of stably reading information regardless of a fluctuation in the oscillation frequency of the light source which may be caused by various reasons.

What is claimed is:

1. An optical information reading apparatus comprising:
   a waveguide means for guiding a light beam from a light source;
   a first diffraction grating for delivering the light beam guided by the waveguide means to an exterior of said waveguide means;
   a second diffraction grating for diffracting a light beam diffracted by said first diffraction grating;
   light beam focusing means for converging a light beam from said second diffraction grating and irradiating the converged light beam onto a surface of an optical information medium; and
   a photodetector for receiving a light beam, of the irradiated light beam, reflected by said surface of said optical information medium;
   wherein said first diffraction grating and said second diffraction grating are arranged such that a change in a diffraction angle of said first diffraction grating caused by a change in the wavelength of the light beam from said source and a change in a diffraction angle of said second diffraction grating caused by said change in said wavelength appear in opposite directions.

2. An optical information reading apparatus according to claim 1, wherein said beam source is a semiconductor laser device capable of emitting a laser beam.

3. An optical information reading apparatus according to claim 1, further comprising a substrate for mounting thereon said light source, said waveguide means and said photodetector, said waveguide means being provided on one side of said substrate and said light source, and said photodetector being mounted on one end of said substrate.

4. An optical information reading apparatus comprising:
   a light source capable of emitting a laser beam;
   a waveguide means for guiding said laser beam;
   a first diffraction grating for causing the laser beam passing through said waveguide means to emerge from said waveguide means,
   a second diffraction grating for diffracting the emergent laser beam towards an optical information medium;
   light beam focusing means for converging the laser beam from said second diffraction grating and irradiating the converged light beam onto a surface of said optical information medium;
   deflecting means for deflecting a beam, of the irradiated beam, which has been reflected by said surface of said optical information medium and transmitted to said waveguide means through said second and first diffraction gratings; and
   a photodetector for receiving the beam deflected by said deflecting means.

5. An optical information reading apparatus comprising:
   a light source capable of emitting a laser beam;
   a waveguide means for guiding said laser beam;
   a first diffraction grating for causing the laser beam passing through said waveguide means to emerge from said waveguide means;
   a second diffraction grating for diffracting the emergent laser beam towards an optical information medium;
   light beam focusing means for converging the laser beam from said second diffraction grating and irradiating the converged light beam onto a surface of said optical information medium;
   deflecting means for deflecting a beam, of the irradiated beam, which has been reflected by said surface of said optical information medium and transmitted to said waveguide means through said second and first diffraction gratings; and
   a photodetector for receiving the beam deflected by said deflecting means;
   wherein the arrangement of said first and second diffraction gratings and the grating pitches of said first and second diffraction gratings are determined such that a change in a diffraction angle of said first diffraction grating caused by a change in the wavelength of the light beam from said source and a change in a diffraction angle of said second diffraction grating caused by said change in said wavelength cancel each other.

6. An optical information reading apparatus according to claim 4, wherein said deflecting means includes a beam splitter and said photodetector is arranged in plural so as to receive fractions of the light beam split by said beam splitter.

7. An optical information reading apparatus comprising:
   a substrate;
   a waveguide means, for guiding a light beam, formed on said substrate;
   a beam splitter provided at an intermediate portion of said waveguide means;
   a first diffraction grating for causing a light beam passed through said beam splitter to emerge from said waveguide means;
   a second diffraction grating for diffracting to deflect the emergent light beam towards an optical information medium;
   a lens for converging the light from said second diffraction grating and irradiating the converged light beam onto a surface of said optical information medium;
   a lens actuator for effecting a focal point control of said lens;
   a photodetector for receiving a light beam which has been reflected by said surface of said optical information medium and transmitted through said second diffraction grating, said first diffraction grating and said beam splitter; and
   a focal point controller for controlling said lens actuator such that a predetermined level of output is obtained from said photodetector.

8. An optical information reading apparatus comprising:
   a light source;
   a waveguide means for guiding a light beam from said light source;
   a first diffraction grating formed in said waveguide means and capable of diffracting said light beam to an exterior of said waveguide path;
   a second diffraction grating for diffracting a light beam from said first diffraction grating to irradiate the same onto a surface of an optical information medium and for directing a light beam reflected by said surface of said optical information medium towards said first diffraction grating, said first diffraction grating being capable of directing the reflected light beam through said second diffraction beam to said waveguide means; and a photodetector capable of receiving the reflected light beam guided through said waveguide means;

said first diffraction grating and said second diffraction grating being arranged such that a change in a diffraction angle of said first diffraction grating caused by a change in the wavelength of the light beam from said source and a change in a diffraction angle of said second diffraction grating caused by said change in said wavelength cancel each other.

9. An optical information reading apparatus according to claim 8, further comprising light focusing means, for converging a light beam, provided at an intermediate portion of an optical path between said second diffraction grating and said optical information medium.

10. An optical information reading apparatus according to claim 9, wherein said light focusing means includes a condenser type diffraction grating which is provided at said waveguide means.

11. An optical information reading apparatus comprising:
a substrate;
a waveguide means, provided on one side of said substrate, for guiding a light beam;
a prism provided on the opposite side of said substrate to said waveguide means;
a first diffraction grating formed at said waveguide means and capable of diffracting a light beam guided through said waveguide means towards said prism;
a second diffraction grating formed on a reflective surface of said prism so as to irradiate the light beam from said first diffraction grating onto an optical information medium; and
a photodetector for receiving a light beam, of the irradiated beam, reflected by said optical information medium;
wherein an arrangement of said first and second diffraction gratings and grating pitches of said first and second diffraction gratings are determined such that an angle of a light beam defracted by said second diffraction grating is kept constant in case of a change in a diffraction angle of said second diffraction grating caused by a change in the wavelength of said light beam guided by said waveguide means.

12. An optical information reading apparatus comprising:
a substrate which is provided on one end thereof with a slant surface;
a waveguide means, provided on a first surface of said substrate, for guiding a light beam;
a light source provided on the other end of said substrate at a position where it is capable of directing a light beam into said waveguide means;
a waveguide type lens formed on said waveguide means and capable of collimating the light beam from said light source;
a first diffraction grating formed on said waveguide path and capable of diffracting the collimated light beam to an exterior of said waveguide means;
a second diffraction grating formed on said slant surface of said substrate and capable of diffracting the light beam from said first diffraction grating so as to direct the light beam towards an optical information medium, said second diffraction grating also being capable of directing the light beam reflected by said optical information medium towards said first diffraction grating, said first diffraction grating being capable of guiding the reflected light beam through said second diffraction grating towards to said waveguide means; and
a photodetector for receiving the light beam reflected by said optical information medium and guided by the waveguide means.

13. An optical information reading apparatus comprising:
a substrate;
a waveguide means, provided on one side of said substrate, for guiding a light beam;
a light source provided on one end of said substrate at a position where it is capable of directing said light beam into said waveguide means,
a first diffraction grating formed on said waveguide means and capable of diffracting the light beam guided by said waveguide means to an exterior of said waveguide means;
a second diffraction grating capable of diffracting the light from said first diffraction grating;
light focusing means for converging the light beam from said second diffraction grating onto a recording surface of said optical information medium, said second diffraction grating being capable of guiding the light beam reflected by an optical information medium towards said first diffraction grating, said first diffraction grating being capable of guiding the reflected light beam from said second diffraction grating into said waveguide path; and
a photodetected provided on said one end of said substrate at a position where it is capable of receiving the reflected light beam guided through said waveguide means.

14. An optical information reading apparatus comprising:
a substrate;
a waveguide means, provided on one side of said substrate, for guiding a light beam;
a first diffraction grating provided on said waveguide means and capable of diffracting the light beam guided through said waveguide means to an exterior of said waveguide means;
reflecting means provided on said substrate and capable of reflecting the light diffracted by said first diffraction grating;
a second diffraction grating provided on said waveguide means and capable of diffracting the light beam reflected by said reflecting means;
light focusing means for converging the light beam diffracted by said second diffraction grating and directing the converged light beam onto an optical information medium; and
a photodetector capable of receiving the light beam reflected by said optical information medium.

15. An optical information reading apparatus comprising:
a substrate;
a waveguide means provided on one side of said substrate;
a first diffraction grating provided on said waveguide path so as to diffract a light beam guided by said waveguide means to an exterior of said waveguide means;
a prism provided on a second surface of said substrate;
a reflecting layer provided on one flat surface of said prism and capable of reflecting the light beam from said first diffraction grating;

a second diffraction grating formed on said waveguide means and capable of diffracting the light beam reflected by said reflecting layer;

light focusing means for converging a light beam diffracted by said second diffraction grating so as to irradiate the converged light beam onto a surface of an optical information medium; and a photodetector capable of receiving a light beam, reflected by said optical information medium.

16. An optical information reading apparatus according to claim 15, further comprising a prism disposed on said second diffraction grating and capable of enabling a control of the optical path such that said light focusing means can optimally receive said light beam.

17. An optical information reading apparatus comprising:

a substrate;

a waveguide means, provided on one side of said substrate, for guiding a light beam;

a light source disposed on one end of said substrate and capable of directing a light beam into said waveguide means;

a curved first diffraction grating formed on said waveguide means and capable of diffracting a light beam guided through said waveguide means and substantially collimating the diffracted light beam;

reflecting means, provided on said substrate, for reflecting the light beam diffracted by said first diffraction grating;

a curved second diffraction grating formed on said waveguide path and diffracting a light beam reflected by said reflecting means and focusing the diffracted light onto an optical information medium; and a photodetector disposed at a position where it is capable of receiving the light beam reflected by said optical information medium.

18. An optical information reading apparatus comprising:

a substrate;

a waveguide means, provided on one side of said substrate, for guiding a light beam;

a light source disposed on one end of said substrate and capable of directing a light beam into said waveguide means;

a photodetector provided on said one end of said substrate and capable of receiving light beam which has been reflected by an optical information medium and guided through said waveguide means;

detection light focusing means, formed on said waveguide means, for converging the reflected light beam from said optical information medium onto said photodetector;

a waveguide type lens formed on said waveguide means and capable of collimating the light beam from said light source guided through said waveguide means;

a first diffraction grating formed on said waveguide path and capable of diffracting the collimated light beam to a reflecting means provided on said substrate but outside said waveguide means, said first diffraction grating being also capable of guiding the reflected light beam from said optical information medium into said waveguide means; and a second diffraction grating formed on said waveguide means and capable of diffracting towards said optical information medium the collimated light beam from said first diffraction grating after reflection by said reflecting means; said second diffraction grating being also capable of guiding the reflected light beam from said optical information medium to said reflecting means.

19. An optical information reading apparatus according to claim 18, further comprising a condenser lens disposed at an intermediate portion of a light path between said optical information medium and said second diffraction grating such as to converge the light beam from said second diffraction grating and to irradiate the same onto the recording surface of said optical information medium.

* * * * *